US011903395B2

(12) United States Patent
Fishter et al.

(10) Patent No.: US 11,903,395 B2
(45) Date of Patent: *Feb. 20, 2024

(54) COFFEE COMPOSITION AND ITEMS MADE THEREFROM

(71) Applicant: THE FOLGER COFFEE COMPANY, Orrville, OH (US)

(72) Inventors: Steven G. Fishter, Wooster, OH (US); Stephen J. Westerkamp, Medina, OH (US); Jennifer Marie Sabo, Brecksville, OH (US); Tracy May Adair, Copley, OH (US); Jessalin Anise Howell, Mason, OH (US); Michael Joe Steven Vaughan, Wooster, OH (US)

(73) Assignee: The Folger Coffee Company, Orrville, OH (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/542,002

(22) Filed: Aug. 15, 2019

(65) Prior Publication Data

US 2020/0100521 A1  Apr. 2, 2020

Related U.S. Application Data

(60) Provisional application No. 62/752,097, filed on Oct. 29, 2018, provisional application No. 62/739,674, filed on Oct. 1, 2018.

(51) Int. Cl.
*A23F 5/12* (2006.01)
*A23F 5/38* (2006.01)
*A23F 5/40* (2006.01)

(52) U.S. Cl.
CPC .............. *A23F 5/125* (2013.01); *A23F 5/385* (2013.01); *A23F 5/405* (2013.01)

(58) Field of Classification Search
CPC .................................. A23F 5/385; A23F 5/405
See application file for complete search history.

(56) References Cited

U.S. PATENT DOCUMENTS 1,641,446 A   9/1927   McColl
1,723,069 A   8/1929   Pauly
(Continued)

FOREIGN PATENT DOCUMENTS

CA   2360453 A1   1/2002
EP   0229920 B1   7/1987
(Continued)

OTHER PUBLICATIONS

English translation of DE2811353A1 Ewert Wolfgang Sep. 27, 1979 (Year: 1979).*

(Continued)

*Primary Examiner* — Katherine D Leblanc
(74) *Attorney, Agent, or Firm* — Michael A. Olshavsky; Timothy D. Smith

(57) ABSTRACT

A coated coffee particle and to various items made a coated coffee particle are provided. The coated coffee particle may be formed or molded in to structured coffee composition. The coated coffee particle is suitable for use in one or more of automatic drip coffee makers, single serving coffee makers, percolating coffee makers, moka pot coffee makers, French press coffee makers, vacuum coffee makers, expresso coffee makers, thermal coffee makers, or any combination of two or more thereof.

14 Claims, 19 Drawing Sheets

(56) References Cited

U.S. PATENT DOCUMENTS

| | | | |
|---|---|---|---|
| 1,951,357 A | | 3/1934 | Hall |
| 2,371,093 A | | 3/1945 | Willison |
| 2,447,258 A | | 8/1948 | Lobley |
| 3,121,635 A | | 2/1964 | Eldred |
| 3,261,689 A | | 7/1966 | Ponzoni |
| 3,607,299 A | | 9/1971 | Bolt |
| 3,660,107 A | | 5/1972 | Mayer |
| 3,713,842 A | | 1/1973 | Lubsen et al. |
| 3,769,031 A | * | 10/1973 | McSwiggin .............. A23F 5/12 426/594 |
| 3,770,457 A | | 11/1973 | Makwinski et al. |
| 4,474,821 A | | 10/1984 | Morrison, Jr. et al. |
| 4,975,295 A | | 12/1990 | Sierra |
| 5,064,676 A | | 11/1991 | Gore |
| 5,227,188 A | | 7/1993 | Leppla et al. |
| 5,725,898 A | | 3/1998 | Murphy et al. |
| 5,776,527 A | | 7/1998 | Blanc |
| 6,291,006 B1 | | 9/2001 | Butterbaugh et al. |
| 6,379,737 B1 | | 4/2002 | Butterbaugh et al. |
| 6,497,911 B1 | | 12/2002 | Hansen et al. |
| 6,783,791 B2 | * | 8/2004 | Bunke ..................... A23F 5/14 426/594 |
| 7,794,771 B2 | | 9/2010 | Kessler |
| 8,389,036 B2 | | 3/2013 | Diolaiti |
| 8,420,150 B2 | | 4/2013 | Rubinstenn et al. |
| 8,541,042 B2 | | 9/2013 | Robinson et al. |
| 8,734,692 B2 | | 5/2014 | Branlard et al. |
| 8,900,648 B2 | | 12/2014 | Bunke et al. |
| 9,155,319 B1 | | 10/2015 | Perlman |
| 9,314,042 B2 | | 4/2016 | Abaurre |
| 9,357,791 B2 | | 6/2016 | Fountain et al. |
| 9,474,290 B2 | | 10/2016 | Young |
| 9,474,291 B2 | | 10/2016 | Young |
| 9,603,376 B2 | | 3/2017 | Young |
| 9,756,869 B2 | | 9/2017 | Young |
| 9,877,495 B2 | | 1/2018 | Charles |
| 9,968,112 B2 | | 5/2018 | Forny et al. |
| 10,004,249 B2 | | 6/2018 | Castro et al. |
| 2005/0255202 A1 | | 11/2005 | Dalziel et al. |
| 2006/0165845 A1 | | 7/2006 | Kaku et al. |
| 2009/0175985 A1 | | 7/2009 | Canham |
| 2010/0119685 A1 | | 5/2010 | Van Bergen |
| 2013/0136843 A1 | | 5/2013 | Blanc |
| 2014/0199441 A1 | | 7/2014 | Liu |
| 2016/0037794 A1 | | 2/2016 | Kang et al. |
| 2016/0120202 A1 | | 5/2016 | Soquet et al. |
| 2016/0128348 A1 | | 5/2016 | Massey et al. |

FOREIGN PATENT DOCUMENTS

| | | |
|---|---|---|
| EP | 0220889 A2 | 7/1988 |
| EP | 0220889 A3 | 7/1988 |
| EP | 0220889 B1 | 7/1988 |
| EP | 0813816 B1 | 12/1997 |
| EP | 0928561 A1 | 7/1999 |
| EP | 1038445 B1 | 11/2002 |
| GB | 1186606 A2 | 4/1970 |
| GB | 2006603 A | 5/1979 |
| GB | 2533912 B | 7/2016 |
| IE | 20000694 | 4/2001 |
| KR | 101799782 B1 | 11/2017 |
| WO | 2001/034475 A1 | 5/2001 |
| WO | 2004/034798 A1 | 4/2004 |
| WO | 2009/081250 A2 | 7/2009 |
| WO | 2009/081250 A3 | 7/2009 |
| WO | 2015/019870 A1 | 2/2015 |
| WO | 2017/098002 A1 | 6/2017 |

OTHER PUBLICATIONS

Non-final Office Action/Restriction Requirement dated Feb. 19, 2021 in U.S. Appl. No. 16/541,978.
Election filed Apr. 19, 2021 in response to Office Action/Restriction Requirement dated Feb. 19, 2021 in U.S. Appl. No. 16/541,978.
Non-final Office Action dated Aug. 6, 2021 in U.S. Appl. No. 16/541,978.
Final Office Action dated Mar. 7, 2022 in U.S. Appl. No. 16/541,978.
Amendment filed May 6, 2022 in response to Final Office Action dated Mar. 7, 2022 in U.S. Appl. No. 16/541,978.
Non-final Office Action dated Jun. 22, 2022 in U.S. Appl. No. 16/541,978.
Amendment filed Sep. 21, 2022 in response to Office Action dated Jun. 22, 2022 in U.S. Appl. No. 16/541,978.
Final Office Action dated Oct. 6, 2022 in U.S. Appl. No. 16/541,978.
Pre-Appeal Brief Request for Review filed Jan. 3, 2023 in response to Final Office Action dated Oct. 6, 2022 in U.S. Appl. No. 16/541,978.
Non-final Office Action dated May 10, 2023 in U.S. Appl. No. 16/541,978.
Amendment filed Sep. 11, 2023 in response to Final Office Action dated May 10, 2023 in U.S. Appl. No. 16/541,978.

* cited by examiner

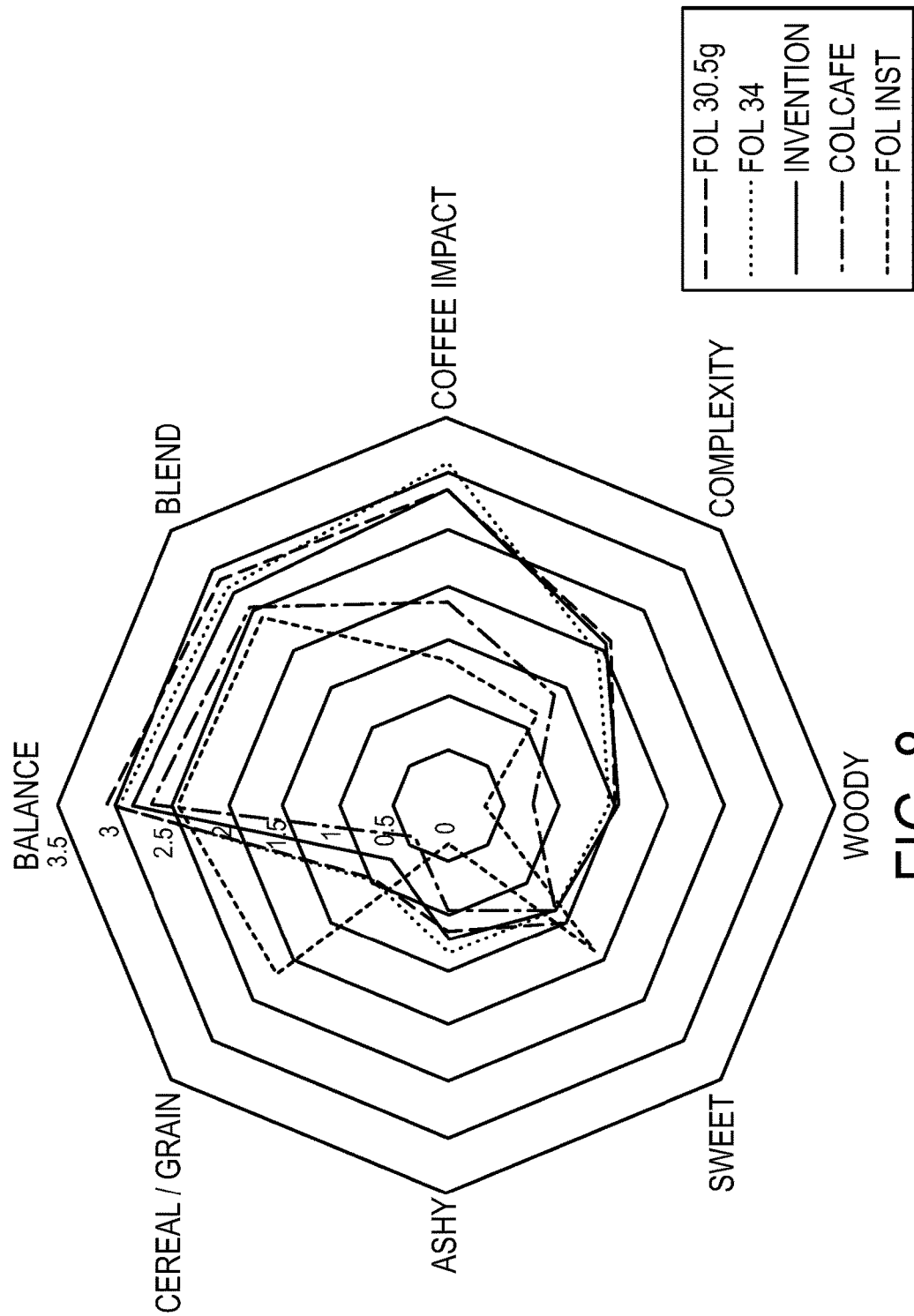

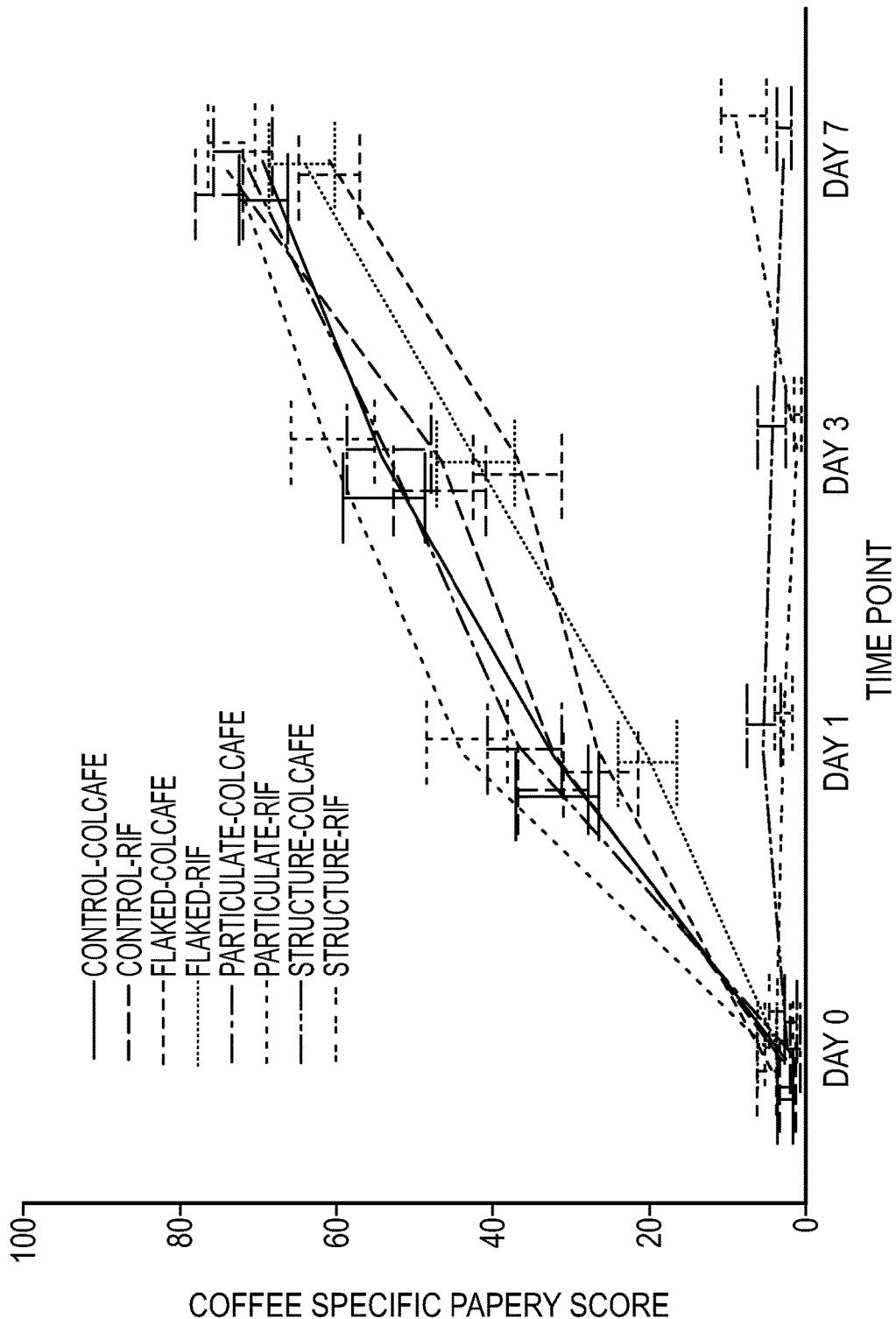

COFFEE COMPOSITION AND ITEMS MADE THEREFROM

CROSS REFERENCE TO RELATED APPLICATIONS

This application claims priority to and any benefit of both U.S. Provisional Application No. 62/739,674, entitled COFFEE COMPOSITION AND ITEMS MADE THEREFROM, and filed Oct. 1, 2018, and U.S. Provisional Application No. 62/752,097, entitled COFFEE COMPOSITION AND ITEMS MADE THEREFROM, and filed Oct. 29, 2018. The complete text of these patent applications are hereby incorporated by reference as though fully set forth herein in their entirety.

FIELD OF THE INVENTION

The present invention relates to a coated coffee particle and to various items made using such coated coffee particles. Further, the coated coffee particle may be formed into a structured coffee composition suitable for use in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

BACKGROUND

Automatic Drip Coffee makers ("ADCs") are designed for processing "ground roast coffee" or "coffee," i.e., granulated coffee obtained by grinding previously roasted coffee beans. Because of differences in flavor strength among different coffees, as well as variations in personal taste, consumers can find it difficult to determine the correct dose (amount) of coffee to use for brewing pots of different sizes.

Single serving coffee makers such as those by Hamilton Beach, Cuisinart, Mr. Coffee and others are generally designed to make a single cup of coffee (but can make slightly larger volumes) using a single use ground, or powered, coffee composition. In some instances, the coffee compositions used in connection with such single serving coffee makers can be powered in nature, in other instances the coffee compositions utilized in connection with such single serving coffee makers can be contained in what is typically viewed as a single use coffee "cup." In this instance, such a coffee "cup" container/structure can contain, but does not require, a built-in filter element that lines the inside surface of such a single "use" coffee cup container/structure. It should be noted that although such coffee cup containers/structures are viewed as single use, the end user or consumer can, and often does, use such single use coffee cups more than once. Other forms of coffee makers and methods for preparing coffee include, but are not limited to, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

To deal with this problem, a number of products have been introduced whereby various manufacturers provide coffee in standardized doses. For example, filter packs in which a predetermined amount of coffee, e.g., enough coffee to brew 4, 6, 8, 10 or 12 servings of brewed coffee, are provided in a filter paper container. However, this approach cannot be used for brewing one, or only a few, servings of coffee, as the consumer is required to make the amount of servings for which the filter pack is designed. In addition, it is difficult to change the strength of the brewed coffee.

In an alternate approach, single serving "containers," "cups," and/or "pods" have been provided in which enough ground roast coffee for brewing only a single serving is housed in a filter paper container. However, single serving pods must have a specific configuration to fit brewer(s) for which they are designed. Machines used to brew coffee with these pods are fundamentally different from automatic drip coffee makers. They are also limited to making a single cup at a time, which limits their usefulness in making larger amounts of brewed coffee.

A further approach combines the idea of a single cup brew is found in products such as Folgers® coffee singles. These can be made with mixtures of instant and ground roast coffee. While they do not have to fit a particular brewer, they still are really only designed to brew a single cup of coffee.

In still another approach, separate "tablets" are provided which are made solely out of instant coffee (also referred to as soluble coffee). However, instant coffee is not preferred by some consumers. A number of processes are known for forming tablets and other shaped articles from granular materials by compression. Most such processes require (1) filling a die, typically closed off at the bottom by a bottom tool, with the material to be tabletted (2) compressing the filled material between upper and lower tools, and (3) ejecting the tablet so formed from the die.

Moreover, when roast and ground (R&G) coffee is exposed to air and/or sunlight for significant amounts of time, it goes stale overtime and exhibits papery notes that are evidence thereof. Further, roast and ground coffee must also be packaged in air tight packaging (e.g., wherein the removal of most oxygen must be purged therefrom) to avoid oxidation occurring thereon causing the roast and ground coffee to become stale.

In light of the above and in view of the current products available in the marketplace, it would be desirable to develop a coffee composition and one or more items made therefrom that utilize a combination of instant coffee with one or more of roast coffee and/or ground coffee to achieve a coffee composition able to withstand exposure to air and light over some time without staling while still maintaining the product's integrity in combination with providing faster disassociation when brewed, thereby advantageously providing a variety of consistent coffee products of varying strengths with the ability to also use less robust packaging therefor.

SUMMARY OF THE INVENTION

Provided are coated coffee particles and to various items made using the coated coffee particles. In another embodiments, the one or more coated coffee particles can be formed into a structured coffee compositions suitable for use in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, cold brew brewers and any methods of preparing cold brew coffee, or any combination of two or more thereof.

In one embodiment, the present invention relates to a coffee composition comprising: a plurality of one or more ground roast coffee particles; and a coating of that includes a mixture of one or more coffee extracts and one or more extracts from the ground roast coffee on the outer surface, the coating has an average thickness in the range of about 5 microns to about 1,500 microns and the average coating coverage of the outer surface of the ground roast coffee particle is in the range of about 50% to about 100%; wherein a weight percent of the one or more ground roast coffee particles is in the range of about 60 wt % to about 90 wt % based on of the total weight of the one or more roast and ground coffee particles and the one or more coffee extracts, a weight percent of the one or more coffee extracts is in the range of about 10 wt % to about 40 wt % based on of the total weight of the one or more roast and ground coffee particles and the one or more coffee extracts.

In another embodiment, the present invention relates to a method of making a coffee composition comprising the steps of: (A) supplying a solution of one or more coffee extracts that includes coffee solids; (B) mixing one or m ore ground roast coffee particles that has an outer surface and the solution of one or more coffee extracts to form a granulated composition that includes ground roast coffee with a coating of one or more coffee extracts; (C) drying the granulated composition to achieve coated ground roast coffee particles where the coating has an average thickness in the range of about 5 microns to about 1,500 microns an average coating coverage of the outer surface of the ground roast coffee particle is in the range of about 50% to about 100%; wherein a weight percent of the one or more ground roast coffee particles is in the range of about 60 wt % to about 90 wt % based on of the total weight of the roast and ground coffee and the coffee solids in the one or more coffee extracts, and a weight percent of the coffee solids in the one or more coffee extracts is in the range of about 10 wt % to about 40 wt % based on of the total weight of roast and the ground coffee particles and the coffee solids of the one or more coffee extracts.

These and other non-limiting aspects of the present disclosure are discussed further herein. The various features of novelty which characterize the invention are pointed out with particularity in the claims annexed to and forming a part of this disclosure. For a better understanding of the invention, its advantages and specific objects attained by its uses, reference is made to the accompanying descriptive matter and drawings in which various embodiments of the invention are illustrated.

BRIEF DESCRIPTION OF THE DRAWINGS

The invention can take form in various compositions and in various process operations. The following is a brief description of the drawings, which are presented for the purposes of illustrating the exemplary embodiments disclosed herein and not for the purposes of limiting the same. The present invention can be more readily understood by reference to the following drawings wherein:

FIG. 8 is a graphical plot of moderate intensity attributes as measured by a sensory panel of various coffee compositions including the present invention;

FIG. 9A is a graph illustrating that the three-dimensional coffee structures of item (b) scored significantly (ANOVA, p less than 0.05) lower compared to all other forms of coffee (items (a), (c) and (d)) for papery notes, a measure of coffee staling, for both instant coffee types;

DETAILED DESCRIPTION OF THE INVENTION

Figure 1:
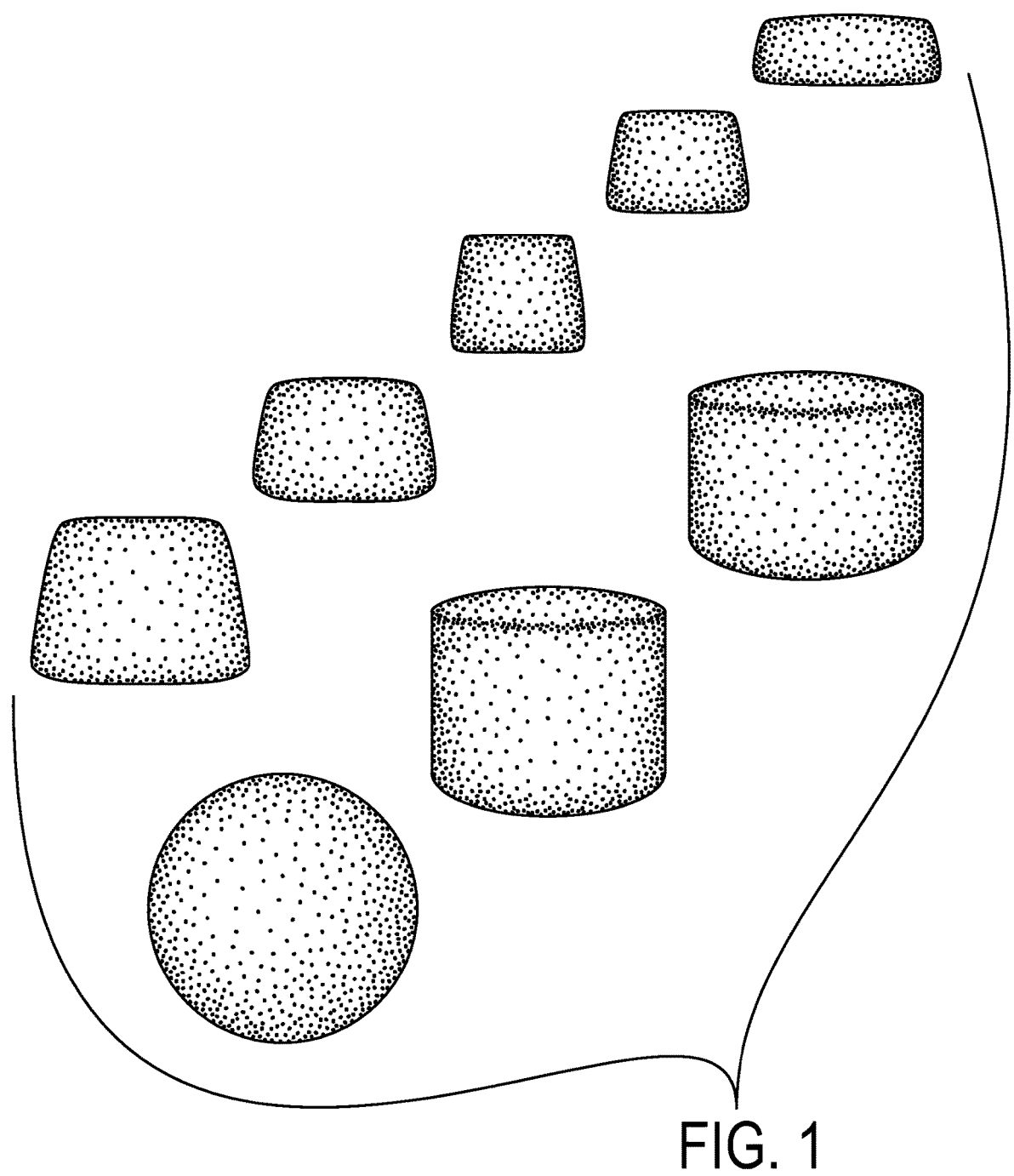
FIG. 1 is an illustration of various structured coffee compositions.

The following discussion is presented to enable a person skilled in the art to make and use one or more of the present embodiments. The general principles described herein can be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Unless otherwise defined, all technical and scientific terms used herein have the same meaning as commonly understood by one of ordinary skill in the art to which the present invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety as though they are fully set forth herein.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that can vary depending on the desired properties sought to be obtained in embodiments of the present invention. Notwithstanding that the numerical ranges and parameters setting forth the broad scope of the invention are approximations; the numerical values set forth in the specific examples are reported with relative precision. Any numerical values, however, inherently contain certain errors necessarily resulting from error found in their respective measurements.

As noted above, the present invention relates to coffee compositions and to various items made using such coffee compositions. In one embodiment, the present invention relates to various coffee compositions and to a variety of items made using such coffee compositions wherein the coffee composition is in the form of coated particulates as disclosed herein. In yet another embodiments, the one or more coated coffee particulates can be formed into any three-dimensional coffee structure suitable for use in one or more of automatic drip coffee makers, single serving coffee makers, percolating coffee makers, moka pot coffee makers, French press coffee makers, vacuum coffee makers, espresso coffee makers, thermal coffee makers, tea diffusers, pour over brewers or methods thereof, or coffee bar brewers or thermal or glass carafe, old brew brewers and any methods of preparing cold brew coffee, or any combination of two or more thereof.

Terminology

Unless otherwise indicated expressly or from context, the following terms will have the following meanings:

"Non-Coffee Binder" means a material which improves the structural integrity of a coffee composition made in accordance with the present invention. "Non-Coffee Binder" does not include ingredients which, although providing some binding activity, provide some other function in significant amount such as contributing to taste, health effects, etc., or any one or more binders made from one or more coffee ingredients and some amount of water.

"Brewed coffee" means a liquid coffee drink formed by extracting coffee solids from ground, roasted coffee beans or substitutes. "Brewed coffee" includes coffee drinks formed from regular coffee, decaffeinated coffee, liquid coffee concentrate, instant coffee and coffee substitutes such as chicory.

"Coffee," "regular coffee," and "ground roast coffee" mean a mass of solid, non-decaffeinated particles derived by comminuting roasted coffee beans. Ground roast coffee can also be referred to as "roast coffee, ground coffee, or even a combination of roast coffee and ground coffee".

"Coffee product" means any product derived from coffee beans.

"Coffee substitute" refers to a substance which is customarily used as a replacement for coffee such as ground roast chicory, roasted soybeans, and roasted grains such as corn/maize, barley, rye, oats, rice, wheat germ, spelt, buckwheat, and millet.

"Coffee solids" means the coffee constituents that are extracted or extractable during the brewing of coffee. Unless indicated otherwise, the term coffee solids refers to both the dissolved coffee solids and suspended coffee solids (e.g., very small grinds or fines).

"Decaffeinated coffee" refers to a solid derived from coffee beans, both roasted and unroasted, which contain a substantially reduced concentration of caffeine.

"Density," as it relates to ground roast coffee and unless otherwise indicated, refers to the number of ounces of that coffee that are needed to fill a container having a predetermined standard volume.

"Free-standing" in reference to a coffee composition means that the coffee composition is not housed in a filter paper container (or other container made from a similar material) which is intended to remain in place, around the composition, when the composition is in place in a brewing device so as to be contacted with water (hot, cold or any temperature therebetween) for brewing.

"Flavor Carrier" refers to a material for containing, carrying, or otherwise being mixed with coffee flavorant to facilitate using the coffee flavorant. Coffee flavorants are normally added to coffee products by means of such flavor carriers, which are provided to make dispensing, metering and mixing of the flavorant with the coffee product easier. For example, flavorants may be added to a flavor carrier in a proportion so that a consistent weight percentage (e.g., 3 weight percent) of the final carrier-containing flavorant compositions can be added to ground roast coffee regardless of the particular flavorant or flavor carrier. Flavor carriers can be in dry, liquid, or paste forms and carrier-containing flavorant compositions added to ground roast coffee can be in dry, liquid, or paste forms.

"Instant coffee" refers to a flowable, particulate coffee product that has been made by evaporating water from a previously made brewed coffee, usually by concentration and drying. Typical drying means, such as spray drying and freeze drying are known in the art. Furthermore, instant coffee used in the present invention can be prepared by any convenient process, of which a variety of processes are known to those skilled in the art. An example of instant coffee production may be found in U.S. Pat. No. 3,700,466, the entire disclosure of which is incorporated by reference as though fully set forth herein. Moreover, representative spray drying processes that can provide suitable instant coffee are disclosed in, for example, pages 382 through 513 of Sivetz & Foote, "Coffee Processing Technology," Vol. I (Avi Publishing Co. 1963), U.S. Pat. Nos. 2,771,343, 2,750,998, and 2,469,553, all of which the entire disclosure of which is incorporated by reference as though fully set forth herein. Other suitable processes for providing instant coffee for use in connection with the present invention are disclosed in, for example, U.S. Pat. Nos. 3,436,227, 3,493,388, 3,615,669, 3,620,756, and 3,652,293, all of which the entire disclosure of which is incorporated by reference as though fully set forth herein. The instant coffee for use in connection with the present invention can be prepared form any single variety of coffees or a blend of different varieties, and can be decaffeinated or un-decaffeinated, and can be processed to reflect a unique flavor characteristic as necessary. Additionally, instant coffee has many forms: spray dried powder, agglomerates, freeze dried and liquid.

"Liquid coffee concentrate" or "liquid coffee extract" as used herein designates an aqueous extract of the roasted coffee beans wherein the solids content is substantially greater than used for direct consumption as a beverage. The coffee solids content may be from about 10 wt % to about 75 wt %. The term as used here indicates a concentrated coffee extract, irrespective of this being liquid or a solid deep frozen coffee concentrate. As is generally known coffee extracts are recovered by contacting roasted and ground coffee beans with water or an aqueous solution. On an industrial scale, the intention is to achieve high extraction efficiency leading to extraction of aroma substances, that is odorants and flavorings, from the ground coffee. The concentration method is not particularly limited and can be performed by a known method and apparatus, evaporation, membrane concentration, concentration under reduced pressure, freeze concentration, and the like. In order to preserve aroma, it may be desirable to remove aromas prior to concentration, and later add aromas back into the concentrate. The aroma collection method is not particularly limited. Examples of such processes can include, but are not limited to steam stripping, distillation, flash evaporation, adsorption, and the like.

"Standard serving of brewed coffee" refers, for each country of the world, brewed coffee as customarily served in that country. For example, in the United States, brewed coffee is served in two different ways, regular strength and espresso strength. In both cases, about 3 grams to about 5 grams of ground roast coffee is used to make the brewed coffee. An exemplary Folgers brand medium roast, ADC ground coffee is brewed using about 3 grams of the ground roast coffee having a density of about 0.33 g/cm$^3$ to make the brew. Regular strength coffee is made with about 5 fluid ounces to about 6 fluid ounces (about 150 mL to about 175 mL) of water, while espresso strength coffee is made with about 1.9 fluid ounces (about 55 mL) of water. Thus, in the United States, a "standard serving of brewed coffee" will be understood as referring to about 5 fluid ounces to about 6 fluid ounces (about 150 mL to about 175 mL) of regular strength brewed coffee as well as to roughly 1.9 fluid ounces (about 55 mL) of espresso strength brewed coffee.

In one embodiment, the present invention is intended for use with any automatic drip coffee maker ("ADC") designed for producing brewed coffee by hot water extraction in which hot water is dripped onto a bed of ground roast coffee. While hot water at a wide range of temperatures can be employed, exemplary temperature ranges for hot water for brewing can include about 70° C. to about 100° C., about 80° C. to about 99° C., about 85° C. to about 97° C., or about 90° C. to about 96° C. However, it is contemplated that brewing may take place in other brewers at high pressures of greater than 100° C. Most automatic drip coffee makers for consumer use are designed to produce anywhere from about 4 to about 12 standard servings of brewed coffee per brewing cycle. The coffee products of the present invention can be used with all such automatic drip coffee makers, regardless of the configuration of their brew baskets. Thus, the minimum number of servings for which a coffee brewer is designed can vary from machine to machine and can be one serving, four servings, ten servings, or some other number of servings. For more information related to ADC brewers see, as disclosed in U.S. Pat. Nos. 9,756,869; 9,603,376; 9,474,291; 9,474,290, which are hereby incorporated by reference as though fully set forth herein in their entirety.

Coated Coffee Particle

The general inventive concepts encompass various embodiments that are based, at least in part, on the discovery of a coated coffee particle. In one or more embodiments, the coated coffee particle may include a ground roast coffee particle that is coated with a coffee extract. In one or more embodiments, the coated coffee particle may be prepared by mixing a solution of coffee extract with ground roasted coffee to form a granulated composition, and at least partially drying the granulated composition. Optionally, the granulated composition may be formed into a structure. Examples of coffee extracts for use in the solution of coffee extracts include, but are not limited to, liquid coffee concentrate and instant coffee.

It has been found that by mixing a solution of coffee extracts with ground roasted coffee to form a granulated composition mixture of the coffee extracts and extracts from the ground roast coffee and at least partially drying the granulated composition a plurality of coated ground roast coffee particles may be prepared. As used herein, the coated ground roast coffee particles may be referred to as coated coffee particles or coated particulates. Through the mixing of the solution of coffee extracts with ground roasted coffee a portion of the ground roasted coffee is extracted. Accordingly, a matrix is formed that includes a mixture of the coffee extracts and extracts from the ground roast coffee on the ground roast coffee particles. Stated differently, the matrix is composed of compounds that originated from both the coffee exact and roast and ground coffee particles. In one or more embodiments, coffee exact may be prepared from an instant coffee, a liquid coffee concentrate, or a combination thereof. For the purpose of this specification, ground roast coffee particles that include a coating of the matrix or coffee extracts and extracts from the round roast coffee may be referred to as the coated ground roast coffee particles. The coating may also be referred to as a coffee extract and ground roast coffee extract matrix or simply the matrix. The coating at least partially covers the surface of the ground roast coffee particles and may fill in any cracks or crevices on the surface of the particle. The coating of the ground roast coffee particles may also bind the particles together to form a structured coffee composition.

As indicated above, the matrix or coating of the ground roast coffee particles compositionally includes a mixture of the coffee extracts and extracts from the ground roast coffee. This mixture may be experimentally shown via Fourier Transform Infrared Spectroscopy (FTIR). FTIR analysis shows a peak that corresponds with a wavelength of 940 nm in the coffee coating that is not present in coffee extracts such as those prepared from instant coffee. This peak is high in ground roasted coffee but is present in lower amounts in the coating. While not wishing to be bound by any particular theory, it is believed that the peak may be related to lipids present in the ground roast coffee, but it may also be a combination of lipids with other compounds that absorb in this region. Time of Flight Liquid Chromatography Mass Spectrometry (LCMS/QTOF) analysis of the coffee coating and ground roast coffee particles, and the coffee extracts may also be used to show compositional differences. For example, coffee extracts such as instant coffee have an extremely low amount of lipids and a different compositional background compared to roast and ground coffee. The presence of high amounts of lipids and/or composition similar to roast and ground coffee but different from instant would indicate a solvent was used. Further, visual appearance of the coating through by surface analysis using scanning electron microscopy or other surface measuring techniques may be used to identify that the coating of coffee extracts was added using a solvent. Visual appearance may also suggest that a solvent was used.

While not wishing to be bound to any one set of problems solved, the coated coffee particle advantageously provides a solution to one or more of the following problems: (a) fast disassociation in hot or cold water; (b) the creation of a larger surface area via capillary action creating void spaces due to solution of the instant component; (c) significantly higher percentages brew solids (BS) are achieved with less coffee weight and volume; (d) delivery of improved brew profile and rich color early in brew; (e) consistent results across a full range of brew methods (i.e., ADC, single serve, French Press, cup infuser, cold brew); (f) the structured coffee composition may be prepared with 100 percent coffee or coffee related flavorings/additives; (g) coffee flavor of instant coffee portion of the composition is enhanced by extraction of flavor notes from ground roast component; (h) cold brewing can be achieved with significantly less volumes of coffee and shorter brew times (e.g., about 2 to about 4 hours or about 2 to about 3 hours for a pitcher); and (i) the product stays fresher longer (less staling perception) when stored in low barrier packaging.

Ingredients:
Ground Roast Coffee

As indicated above, the coated coffee particle may be prepared from ground roast coffee. Ground roast coffee is made from coffee beans, which are the seeds of "cherries" that grow on coffee trees in a narrow subtropical region around the world. There are many coffee varieties, however, it is generally recognized that there are two primary commercial coffee species: *Coffea arabica* (herein "*Arabica(s)*") and *Coffea canephora* var. *robusta* (herein "*Robusta(s)*"). See, US 2008/0118604, the disclosure of which is incorporated herein by reference as though fully set forth in its entirety. Virtually any of the above varieties and types of ground coffees produced from the coffee beans discussed above can be used to make the structured coffee composition. Further, mixtures of two or more different varieties, or types, of ground coffees described above can also be used in combination to prepare the structured coffee composition.

When removed from the coffee cherry, coffee beans normally have a distinctly green color and a high moisture content. Therefore, they are normally dried prior to export, typically to a moisture content of about 12 weight percent. Historically, solar drying was the method of choice, although machine drying is now normally used due to the reliability and efficiency of the machine dryers available for this purpose. See, Sivetz et al., *Coffee Technology*, "Drying Green Coffee Beans", pp. 112 to 169 (1979). Sivetz also highlights the irreversible damage over-drying can have on coffee quality.

In other embodiments, the coffee been may be "pre-dried" prior to roasting. In these or other embodiments, the coffee beans may be dried to a moisture content in the range of about 0.5% to about 10% by weight. Exemplary methods of pre-drying a coffee bean are disclosed in U.S. Pat. Nos. 5,160,757 and 5,322,703 and which are both incorporated by reference as though fully set forth herein. This drying may take place at the end of the standard drying or may be added as an additional drying step prior to roasting. However, in either case, the moisture should be reduced prior to roasting. This additional or low moisture drying can occur at any suitable set of conditions in one or more additional drying steps and is conveniently done by heating the coffee beans at a temperature in the range of about 70° F. to about 325° F. (21° C. to 163° C.), or from about 90° F. to about 300° F., or from about 120° F. to about 275° F., or even from about 160° F. to about 250° F. over drying times lasting about 1 minute to about 24 hours, or from about 30 minutes to about 24 hours, or from about 1 hour to about 24 hours, or from about 2 hours to about 12 hours, or from about 3 hours to about 6 hours, or even from about 4 hours to about 5 hours.

After drying the green coffee beans (and optionally pre-drying the coffee beans), the coffee beans to are typically processed into conventional ground roast coffee by roasting followed by grinding. Any of the variety of roasting techniques known to the art can be used to roast the green coffee in the process of the present invention. In the normal operation of preparing conventional roast and ground coffee, coffee beans can be roasted in a hot gas medium at temperature ranges of about 176.8° C. to about 371.1° C. (about 350° F. to about 700° F.), or about 176.8° C. to about 260° C. (about 350° F. to about 500° F.), or about 204.4° C. to about 232.2° C. (about 400° C. to about 450° F.), or about 260° C. to about 287.8° C. (about 500° C. to about 550° F.), or about 315.6° C. to about 348.9° C. (about 600° C. to about 660° F.), with the time of roasting being dependent on the flavor characteristics desired in the coffee beverage when brewed. Here, as well as elsewhere in the specification and claims, individual numerical values, or limits, can be combined to form additional non-disclosed and/or non-stated ranges.

Where coffee beans are roasted in a batch process, the batch roasting time at the hereinbefore given temperatures is generally from about 2 minutes to about 20 minutes, and can, for example, be about 10 minutes to about 20 minutes or about 12 minutes to about 18 minutes, or can be about 2 minutes to about 10 minutes, or about 2 minutes to about 6 minutes, or about 2 minutes to about 4 minutes, or about 2 minutes to about 3 minutes. Where coffee beans are roasted in a continuous process, the residence time of the coffee beans in the roaster is typically from about 30 seconds to about 9 minutes, and can, for example, be about 30 seconds to 6 about minutes, or about 30 seconds to about 4 minutes, or about 1 minutes to about 3 minutes. The roasting procedure can involve static bed roasting as well as fluidized bed roasting. A preferred type of roasting would be using fast roasters. While any method of heat transfer can be used in this regard, convective heat transfer, especially forced convection, is normally used for convenience. The convective media can be an inert gas or, more typically, air. Typically, the beans are charged to a bubbling bed or fluidized bed roaster where they contact a hot air stream at inlet air temperature of from about 350° F. to about 1200° F. (about 177 C to about 649° C.), or from about 400° F. to about 800° F. (about 204° C. to about 427° C.), at roast times form about 10 seconds to not longer than about 5.5 minutes, or from about 10 seconds to about 47 seconds.

As is well known to coffee professionals, it is conventional to refer to the degree or extent to which coffee beans are roasted in terms of their Hunter color level. The Hunter Color "L" scale system is generally used to define the color of the coffee beans and the degree to which they have been roasted. Hunter Color "L" scale values are units of light reflectance measurement, and the higher the value is, the lighter the color is since a lighter colored material reflects more light. Thus, in measuring degrees of roast, the lower the "L" scale value the greater the degree of roast, since the greater the degree of roast, the darker is the color of the roasted bean. This roast color is usually measured on the roasted, quenched and cooled coffee beans prior to subsequent processing (e.g., grinding and/or flaking) into a brewed coffee product. However, color may be measured on finished product, in which case the color will be designated as such. See, pages 985-95 of R. S. Hunter, "Photoelectric Color Difference Meter," *J. of the Optical Soc. of Amer.*, Volume 48 (1958).

The ground roast coffee that is used to make the structured coffee composition can be made from coffee beans roasted to any desired roast color from about 10 L (very dark) to about 25 L (very light). In some embodiments, it is contemplated that the coffee beans will be fast roasted to an average color of from about 13 to about 19 Hunter L units, or from about 14 to about 18 Hunter L units, or even about 15 to about 17 Hunter L units.

Once the coffee beans are roasted, they are ground to a desired average particle size. Average particles sizes on the order of as low as about 250 μm (microns) and as high as about 3 mm, as measured by Laser Diffraction on a Sympatec Rodos Helos laser particle size analyzer, are conventional. Average particle sizes on the order of about 400 μm to about 2,500 μm, or from about 500 μm to about 2,400 μm, or from about 650 μm to about 2,200 μm, or from about 800 μm to about 2,000 μm, or from about 900 μm to about 1,00 μm, or from about 1,000 μm to about 1,600 μm, or from about 1,200 μm to about 1,400 μm, or even about 1,300 μm. The coffee beans can be ground to other average particle sizes, including for example, average particle sizes of about 400 μm to about 1.5 mm, or from about 300 μm to about 1,600 μm, or even from about 1 mm to about 2 mm. It is also recognized that larger coffee particles can be broken down during three-dimensional shape molding, resulting in smaller average particle sizes within the molded structure formed from the various coffee compositions described herein.

In one or embodiments, the size of the ground roast coffee particles may be described with reference to the size range of the coffee typically employed for a particular brewing method. In one or more embodiments, the ground roast coffee particles may be a coarse grind typically used for French press or percolator coffee brew, for example (e.g., about 900 microns to about 1400 microns), a medium-coarse grind typically used for pour over brewers, flat bottom drip brewer or ADC, or Aeropress, for example, (e.g., about 800 microns to about 1200 microns), a medium grind typically used for clever dripper, café solo, or single serve brewer, for example, (e.g., about 500 microns to about 900 microns), a medium fine grind typically used for Turkish coffee, for example, (e.g., about 200 microns to about 550 microns) or a super fine grind typically used for espresso, or moka pot, for example (e.g., about 200 microns to about 450 microns), or any one or more combinations thereof based on the desired type of coffee beverage and coffee strength. Of course, there can be a size distribution around these mean particle sizes, so that the grind can be further characterized by full particle size distribution curve. One convenient measure is Q250, the percent of particles less than about 250 microns, which represents the amount of finer particles (or "fines") that are included in the distribution and that help make up the mean size.

In one or more embodiment the roast ground coffee particles may be prepared using mill flaking. Mill flaking technology or mill flaking is a unique grinding process that creates a larger surface area on each flake for hot water to easily extract more of our coffee flavor. Flaked coffee is further disclosed in for example, U.S. Pat. No. 5,064,676, the entire disclosure of which is incorporated by reference as though fully set forth herein.

As appreciated by skilled coffee professionals, different ground coffees exhibit different bulk densities depending on the type of coffee used, the method by which the coffee is roasted, the color of the roasted coffee, the particle size to which the coffee is ground, moisture content, and other factors. In accordance with the present invention, the structured coffee compositions can be made for ground roast coffee having any conventional density. So, for example, the structured coffee composition can be made from ground roast coffees having "regular" densities ranging between about 0.26 g/mL to about 0.35 g/mL such as, for example, about 0.263 g/mL, about 0.288 g/mL, about 0.325 g/mL, or even about 0.35 g/mL, if desired. Alternatively, the structured coffee composition can also be made for ground roast coffees having lower or higher densities, if desired. For example, the inventive coffee compositions can be made from high density coffees having densities of greater than about 0.40 g/cm$^3$, e.g., densities of up to about 0.60 g/cm$^3$, although even higher densities are contemplated and within the scope of the present invention. Similarly, the inventive coffee compositions can be made from low density coffees having densities of less than about 0.18 g/cm$^3$ to about 0.26 g/cm$^3$, e.g., densities of about 0.18 g/cm$^3$ to about 0.26 g/cm$^3$, about 0.20 g/cm$^3$ to about 0.25 g/cm$^3$, or even about 0.22 g/cm$^3$ to about 0.23 g/cm$^3$ (such as about 0.19 g/cm$^3$, about 0.20 g/cm$^3$, about 0.21 g/cm$^3$, about 0.22 g/cm$^3$, about 0.23 g/cm$^3$, about 0.24 g/cm$^3$ or even about 0.25 g/cm$^3$). Furthermore, the inventive coffee compositions can be made from higher density coffees having densities from about 0.39 g/cm$^3$ to about 0.57 g/cm$^3$, or from about 0.40 g/cm$^3$ to about 0.56 g/cm$^3$, or from about 0.46 g/cm$^3$ to about 0.48 g/cm$^3$, or even about 0.47 g/cm$^3$. In this regard, see U.S. Pat. No. 5,160,757 for a description of how to make low density coffees and U.S. Pat. No. 5,227,188 for a description of how to make high density coffees. The entire disclosures of both of these patents are incorporated herein by reference as though fully set forth herein in their entireties.

As appreciated by skilled coffee professionals, different ground coffees also exhibit different moisture contents depending on the type of coffee used, the method by which the coffee is roasted, the color of the roasted coffee, the particle size to which the coffee is ground, and other factors. So, for example, the structured coffee composition can be made from ground roast coffees having moisture contents of about 1 weight percent to about 7 weight percent, or from about 1.5 weight percent to about 6.5 weight percent, or from about 2 weight percent to about 6 weight percent, or from about 2.5 weight percent to about 5.5 weight percent, or from about 3 weight percent to about 5 weight percent, or from about 3.5 weight percent to about 4.5 weight percent, or even from about 3.75 to about 4.25 weight percent. In one instance, the inventive coffee composition can be made from ground roast coffees having moisture contents of about 1.5 weight percent to about 6.6 weight percent, or from about 2.85 weight percent to about 6 weight percent, or even from about 4.5 weight percent to about 4.85 weight percent.

Generally speaking, the structured coffee composition can also be made from mixtures of two or more of the coffees described above. So, for example, the structured coffee composition can be made from mixtures of ground roast coffees having different densities, different Hunter L colors, different particle sizes, different moisture contents, and different combinations thereof (i.e., one ground roast coffee could have a low density and a high moisture content while another ground roast coffee could have a medium density and a low moisture content). Thus, the structured coffee composition can be made from mixtures of regular and high density coffees, mixtures of regular and low density coffees, mixtures of high and low density coffees, and mixtures of high, regular and low density coffees, if desired. In addition, the structured coffee composition can be made from mixtures ground roast coffees having high and low Hunter L color numbers, large and small average particle sizes, etc.

Moreover, although some or all of this ground roast coffee can be decaffeinated, in one embodiment it is desirable that essentially all of the ground roast coffee is "regular," i.e., non-decaffeinated coffee. In another instance, embodiments in which essentially all of the ground roast coffee in the coffee compositions of the present invention is/are decaffeinated are also within the scope of the present invention.

In one or more embodiments, the amount of one or more ground roast coffees (both regular and decaffeinated) included in the structured coffee composition used are in the range of about 60 weight percent to about 90 weight percent, or from about 65 weight percent to about 87.5 weight percent, or from about 70 weight percent to about 85 weight percent, or from about 72.5 weight percent to about 82.5 weight percent, or from about 75 weight percent to about 80 weight percent even about 77.5 weight percent, based on of the total weight of the roast and ground coffee and the coffee extract.

Instant Coffee

As indicated above, the coated coffee particle may include instant coffee. The instant coffee may be used to form a slurry in the preparation of the structured coffee composition by adding water to an instant coffee. The slurry is then combined with roast and ground coffee. It has been found that when an instant coffee is included in the structured coffee composition, the instant coffee may be used as one or more of a binder, a coating aid, a disintegration aid, and a brewing aid.

The presence of instant coffee in coffee compositions and/or structures can be detected by a number of different methods. However, one method is described in R. M. Noyes and C. M. Chu, "Material Balance on Free Sugars in the Production of Instant Coffee", ASIC, 15$^{th}$ Colloque, Montpellier, 1993, which is incorporated herein by reference. Also, the differences in visible appearance and the hygroscopic nature of instant coffee might permit the presence of instant coffee in a coffee product to be detected by a visual inspection, especially if observed under a microscope. See various methods of detecting presence of instant coffee also as disclosed in U.S. Pat. Nos. 9,756,869; 9,603,376; 9,474,291; 9,474,290, which these patent applications are hereby incorporated by reference as though fully set forth herein in their entirety.

As appreciated by skilled coffee professionals, different instant coffees also exhibit different moisture contents depending on the method of which the instant coffee is prepared and other factors. In one or more embodiments, the instant coffee may have a moisture content of less than 7 weight percent, or less than 6.5 weight percent, or less than 6 weight percent, or of less than 5.5 weight percent, or of less than 5 weight percent, or less than 4.5 weight percent, or of less than 4 weight percent, or less than 3.5 weight percent, or of less than 3 weight percent. In one or more embodiments, the instant coffee may have a moisture content of about 0.5 weight percent to about 7 weight percent, or from about 1 weight percent to about 6.5 weight percent, or from about 1.5 weight percent to about 6 weight percent, or from about 2 weight percent to about 5.5 weight percent, or from about 2.5 weight percent to about 5 weight percent, or from about 3 weight percent to about 4.5 weight percent, or even from about 3.5 to about 4.25 weight percent.

Suitable instant coffee for use in the structured coffee composition include, but are not limited to, spray dried powder, agglomerates, freeze dried and liquid instant coffees. In one or more embodiments, the instant coffee may be characterized by the yield of the instant coffee. The instant coffee may be a high yield instant coffee, a medium yield instant coffee, or a low yield instant coffee. High yield instant coffees include those instant coffees that are prepared with an extraction of greater than 45%. High yields instant coffees may be obtained using a primary and then a secondary extract with high water temperatures. Typically, high yield instant coffees include a high robusta content to maximize extraction yield. Medium yield instant coffees include those instant coffees that are prepared with an extraction of between 25% to 45%. Typically, medium yield instant coffees include a high Arabica content with a minimal robusta content. Low yield instant coffees include those instant coffees that are prepared with an extraction of less than 25%. Low yield instant coffees may be obtained using only a primary extraction at temperatures generally at or below 100° C. Typically, low yield instant coffees include a high Arabica content (up to 100%). In one or more embodiments, the instant coffee may be characterized by the quality of the instant coffee. The instant coffee may be a high quality instant coffee or a low quality instant coffee. High quality instant coffees include those instant coffees that produce a cup of brewed coffee with an aroma similar to a roast and ground coffee and have a flavor with minimal processed and Carmel notes. Typically, high quality instant coffees include a high Arabica content (up to 100%) and are produced at a low extraction yield. Low quality instant coffees include those instant coffees that have a dull or unexciting flavor that may taste stale. Typically, low quality instant coffees include a high robusta content and are produced at a high extraction yield. In some embodiments a low yield, high quality instant coffee is used. In another embodiment a high yield instant coffee is used. The structured coffee composition may employ a variety and types of instant coffee can be used, including a high yield, high quality instant coffee, a high yield, low quality instant, or a low yield, low quality instant, or one or more combinations thereof any one or more instant coffee varieties and types of instant coffee. Exemplary instant coffees can be used with the present invention to make the coffee composition, including but not limited to, those as shown below in Table 1.

TABLE 1

| Supplier | Instant Coffee | Type |
| --- | --- | --- |
| Haco | IC SD Premium Breakfast FO | Low Yield-High Quality |
| Haco | Columbian | Low Yield-High Quality |
| Bustelo | Bustelo Freeze Dried | Low Yield-High Quality |
| Bustelo | Decaf Freeze Dried | |
| Suffolk | Decaf Colombian #947 | Low Yield-High Quality |
| Colcafe | PDM-100% Col. Spray dried | |
| Suffolk | Colombian #932 | Low Yield-High Quality |
| Suffolk | Washed Arabica 65%/Robusta 35% #904 | Low Yield-High Quality |
| Suffolk | Washed Arabica 60%/Folgers A Braz 40% #913 Robusta 35% | Low Yield-High Quality |
| Suffolk | Washed Arabica 65%/Robusta 35% #904 | Low Yield-High Quality |
| Suffolk | Washed Arabica 60%/Folgers A Braz 40% #913 Robusta 35% | Low Yield-High Quality |
| Iguacu | IGUA SU Type 100012270 | High Yield |
| Medaglia | Medaglia O'ORO Instant | High Yield |
| Kava | Kava Acid Neutralized Instant | High Yield |
| Folgers crystals | Folgers Instant Crystals | High Yield |
| Bustelo | Café Bustelo Mexican Blend | High Yield |
| Pilon | Pilon Instant Espresso Coffee | High Yield |
| Bustelo | Espresso Café Bustelo Instant Coffee | High Yield |
| Iguacu | 100% Arabica | |
| Prosol | Spray dried instant Ref:L-136050 | Spray Dried Decaf-High yield |
| Suffolk | Colombian #932 | Low Yield-High Quality |

The amount of instant coffee that may be included in the coated coffee particles should be enough to achieve a noticeable improvement in one property such as binding strength, ease of disintegration and/or brewing efficiency, and staling resistance. In one or more embodiments, the instant coffee that may be included in the structured coffee composition in an amount that will not unduly alter the flavor of the coffee brew produced. In one embodiments, instant coffees may be included in the structured coffee compositions in the range of about 35 weight percent to about 10 weight percent, or from about 32.5 weight percent to about 12.5 weight percent, or from about 30 weight percent to about 15 weight percent, or from about 27.5 weight percent to about 17.5 weight percent, or from about 25 weight percent to about 20 weight percent or even about 22.5 weight percent, based on of the total weight of the roast and ground coffee and the coffee extract.

Liquid Coffee Concentrate

As indicated above, the coated coffee particle may include a liquid coffee concentrate. Liquid coffee concentrates may be purchased commercially or prepared prior to inclusion in the structured coffee composition. It has been found that when a liquid coffee concentrate is included in the preparation of a structured coffee composition, the liquid coffee concentrate may be used as one or more of a binder, a coating aid, a disintegration aid, and a brewing aid.

In one or more embodiments, a liquid coffee concentrates may be prepared by concentrating the draw-off stream from a liquid extraction process. This process utilizes hot and/or cool water and and/or steam to extract soluble coffee from roast and ground coffee. The liquid stream may then be concentrated by either thermal evaporation or freeze concentration or an alternate method. The concentrated stream of liquid coffee extract can be utilized to create a slurry, or with a roast and ground coffee with or without adding additional process water. In order to preserve aroma, it may be desirable to remove aromas prior to concentration, and later add aromas back into the concentrate. The aroma collection method is not particularly limited. Examples of such processes can include, but are not limited to steam stripping, distillation, flash evaporation, adsorption, and the like. An exemplary liquid coffee concentrate are described in U.S. Pat. No. 9,113,643, which is incorporated herein in their entirety.

In one or more embodiments, a commercially available liquid coffee concentrate may be employed in the structured coffee composition. Liquid coffee concentrate is often sold in frozen form, and may be thawed prior to being combined with roast and ground coffee.

In one or more embodiments, the liquid coffee concentrate may be characterized by the percent of coffee solids in the total volume of the liquid coffee concentrate. In one or more embodiments, the liquid coffee concentrate may have coffee solids in an amount of about 10% to about 75%, in other embodiments in an amount of about 15% to about 70%, in other embodiments in an amount of about 20% to about 65%, in other embodiments in an amount of about 25% to about 60%, in other embodiments in an amount of about 30% to about 58%, in other embodiments in an amount of about 35% to about 55%, and in other embodiments in an amount of about 40% to about 50%.

The amount of liquid coffee concentrate that may be included in the structured coffee composition should be enough to achieve a noticeable improvement in at least property such as binding strength, ease of disintegration and/or brewing efficiency, and staling resistance. In one or more embodiments, the coffee solids from the liquid coffee concentrate may be included in the structured coffee composition in an amount that will not unduly alter the flavor of the coffee brew produced. In one embodiments, the coffee solids from the liquid coffee concentrate may be included in the structured coffee compositions in the range of about 35 weight percent to about 10 weight percent, or from about 32.5 weight percent to about 12.5 weight percent, or from about 30 weight percent to about 15 weight percent, or from about 27.5 weight percent to about 17.5 weight percent, or from about 25 weight percent to about 20 weight percent or even about 22.5 weight percent, based on the overall weight of the total weight of structured coffee composition.

Additional Additives

The coated coffee particles may include on or more additional ingredients. For example, decaffeinated varieties of the above coffees can be used in addition to, or in place of, the ground roast coffees described above. Similarly, coffee substitutes such as ground chicory, roasted soybeans, and roasted grains such as corn, rye, wheat, barley, oats, rice, wheat germ, spelt, buckwheat, and millet can be included in the structured coffee composition (Instant coffee is not a "coffee substitute" in this context). Coffee flavorings, as further discussed below, can be included. Also, various excipients such as binders and disintegration aids can be included and, surprisingly, it has been found that some liquid flavor carriers act as a binder in coffee products. See for example, as disclosed in U.S. Pat. Nos. 9,756,869; 9,603,376; 9,474,291; 9,474,290; 6,277,428; 6,090,431; 1,951,357, and EP 813816, the entire disclosures of all of these patents are incorporated herein by reference as though fully set forth herein in their entireties. While binders included in certain embodiments, in other embodiments the structured coffee composition is free of non-coffee binders. In one or more embodiments, the additional ingredients may be added during the step of mixing the one or more ground roast coffee and the solution of one or more coffee extracts. In other embodiments, the additional ingredients may be added to the structured coffee composition (e.g., after the step of drying).

Flavorants, both liquid and solid (or dry), can be included in the structured coffee products in conventional amounts. Exemplary flavorants include French vanilla, hazelnut, amaretto, cappuccino, chocolate, mint, peppermint, cinnamon, vanilla, caramel, maple, toffee, pumpkin, spices, Irish Cream, Kahlua®, Crème Brulee, and nut flavors such as almond and macadamia nut, and so forth. The flavorants that can be used include those known to the skilled artisan, such as natural and artificial flavorants. A solid sweetener such as white granulated sugar may be used in connection with the structured coffee product. Examples of a whitening agent that can be used in connection with the structured coffee products include liquid dairy components and dry dairy components. Other suitable sweeteners that can be used in connection with the structured coffee compositions are those well known in the art, including both natural and artificial sweeteners, including but not limited to also high intensity sweeteners. See, for example, U.S. Pat. Nos. 9,706,785; 10,182,583; and 10,278,407, which disclose flavorants, sweeteners, and whitening agents for inclusion into the structured coffee products. These patent applications are hereby incorporated by reference as though fully set forth herein in their entirety.

In one or more embodiments, where the coated coffee particle is in a structured coffee composition, the structured coffee composition may be made with one or more layers of additives, for example, coffee composition, flavorant, sweetener, whitener, etc. In one or more embodiments, the structured coffee composition may include one or more layers on a side of the structured coffee composition (e.g., the top, bottom, or any side or rounded face of the structured coffee composition). In these or other embodiments, the structured coffee composition may include one or more layers that bisect or are situated between two portions of the coffee composition in the structured coffee composition. In other various embodiments, the structured coffee compositions may be made with one or more various elements including the coffee composition, flavorant, sweetener, whitener, etc., wherein the structured coffee composition is a homogenous mixture of any one or more of the foregoing included therein.

Method of Making a Coated Coffee Particle:

As indicated above, the coated coffee particles may be prepared by mixing a solution of brewed coffee extracts with ground coffee to form a granulated composition, forming a structure from the granulated composition, and at least partially drying the structure.

In one or more embodiments, the solution of brewed coffee extracts may be prepared from instant coffee. In these or other embodiments, the instant coffee may be mixed with a solvent to prepare the solution of brewed coffee extracts. Suitable solvents for used in preparing the solution of brewed coffee extracts include, but are not limited to water, ethanol, ethyl acetate, brewed extracts from coffee, tea, juice, carbonated water, nitrogen infused water, and liquid $CO_2$, among others. Any suitable method of mixing the instant coffee and the solvent may be used. Generally, the instant coffee and the solvent are mixed until smooth and uniform consistency is achieved. In certain embodiments, at higher concentrations, the solution of coffee extract prepared using an instant coffee may be a slurry.

In one or more embodiments, the solution of coffee extracts that includes instant coffee may be described as a weight to weight ratio of the instant coffee to the solvent. In one or more embodiments, the weight to weight ratio of the instant coffee to the solvent may be from about 4:1 to about 1:2, in other embodiments from about 3:1 to about 1:1.75, in other embodiments from about 2:1 to about 1:1.5, in other embodiments from about 1.5:1 to about 1:1.25, in other embodiments from about 1.15:1 to about 1:15.1, in other embodiments from about 1.1:1 to about 1:1.1, and in other embodiments from about 1.05:1 to about 1:1.05.

In one or more embodiments, the solution of coffee extracts that includes instant coffee may be described as a weight percent of coffee solids in the solution of brewed coffee extracts. In these or other embodiments, the solution of brewed coffee extracts that includes instant coffee may include coffee solids in the range of about 3 wt % to about 75 wt %, in other embodiments in the range of about 5 wt % to about 70 wt %, in other embodiments in the range of about 10 wt % to about 65 wt %, in other embodiments in the range of about 15 wt % to about 60 wt %, in other embodiments in the range of about 20 wt % to about 55 wt %, in other embodiments in the range of about 30 wt % to about 53 wt %, and in other embodiments in the range of about 35 wt % to about 50 wt %.

In one or more embodiments, liquid coffee concentrate may be used as or to prepare the solution of coffee extract(s). In one or more embodiments, the liquid coffee extract may be used as prepared (i.e. the product of an extraction and an optional concentration). In other embodiments, the liquid coffee concentrate may be diluted with a solvent. In certain embodiments, at higher concentrations, the solution of coffee extracts prepared using a liquid coffee concentrate may be a slurry. Regardless, in one or more embodiments, the solution of coffee extracts that includes a liquid coffee concentrate may be described as a weight percent of coffee solids in the solution of coffee extracts. In these or other embodiments, the solution of brewed coffee extracts that includes a liquid coffee concentrate may include coffee solids in the range of about 3 wt % to about 75 wt %, in other embodiments in the range of about 5 wt % to about 70 wt %, in other embodiments in the range of about 10 wt % to about 65 wt %, in other embodiments in the range of about 15 wt % to about 60 wt %, in other embodiments in the range of about 20 wt % to about 55 wt %, in other embodiments in the range of about 30 wt % to about 53 wt %, and in other embodiments in the range of about 35 wt % to about 50 wt %.

In one or more embodiments, the solution of coffee extracts may include a mixture of instant coffee and liquid coffee concentrate. For example, a solution of coffee extracts may be prepped by combining a solution prepared by combining instant coffee and a solvent with a liquid coffee concentrate. In other embodiments, the instant coffee may be added to a liquid coffee concentrate to prepare a solution of coffee extracts. The ranges and amount of coffee solids provided above for the liquid coffee concentrate may be used in a solution of coffee extracts that includes a mixture of instant coffee and liquid coffee concentrate.

The solution of coffee extracts may then be combined with a ground roast coffee to form a granulated composition. Any suitable method of mixing the solution of coffee extracts and the ground roast coffee may be used. Suitable mixing device include, but are not limited to stand mixers, spatulas, and paddle mixers. In certain embodiments, the solution of coffee extracts may be sprayed on the ground roast coffee to form a granulated composition. Typically, prior to drying the granulated composition may be described as sticky.

In one or more embodiments, the amount of solution of coffee extracts and the amount of ground roast coffee in the granulated composition may be described as a weight to weight ratio of the weight of the coffee solids in the solution of coffee extract(s) to the weight of the ground roast coffee. In one or more embodiments, the ratio of the coffee solids in the solution of coffee extracts to the ground roast coffee may be from about 10:90 to about 40:60, in other embodiments from about 12.5:87.5 to about 37.5:62.5, in other embodiments from about 15:85 to about 35:65, in other embodiments from about 17.5:82.5 to about 32.5:67.5, and in other embodiments from about 20:80 to about 30:70.

After the granulated composition it may be formed or otherwise shaped into a structure. In one or more embodiments, the granulated composition may be formed into an agglomerate with a random shape. In other embodiments, the granulated composition may be formed or molded into geometrical shape such as, for example, polyhedrons and curved three-dimensional shapes.

In one or more embodiments, the granulated composition may be formed into a structure using a press or a die. Suitable presses include a Carver Press, for example Model #3912. In these or other embodiments, a low amount of pressure or compaction should be employed in the forming of the structure so the resultant structured coffee composition is not completely compressed and includes a level of porosity. For example, a de minimis amount of pressure may be applied to achieve a pressure that slightly exceeds 0 pounds per square inch (PSI). In other embodiments, an amount of pressure may be applied to achieve a compaction of the granulated composition of between 60% and 70%. For example, a portion of the granulation composition may be molded using a target compaction travel on a carver press of 94% which is calculated by taking the amount in millimeters of the 100 percent travel of the die assembly and multiplying by 0.94 to determine the amount of travel in millimeters to achieve a 94% compaction travel target using hand compaction until the target travel is achieved thereby resulting in a compaction of 60 percent to 70 percent of the granulated coffee.

After the granulated composition is formed into a structure, it may be dried to form the structured coffee composition. In one or more embodiments, water or other solvents may be removed by air drying, microwave drying, infrared drying, etc.

After the drying step a residual amount of water, moisture, or a combination thereof may remain in the coated coffee particles. The solvent content (i.e. water, other solvents, or a combination of water and other solvents) of the of the coated coffee particles may be determined by oven drying coupled with weight analysis to provide the most universal method across solvents, allowing one to measure percent loss of the solvent or Karl Fischer Titration. In one or more embodiments, the coated coffee particles may have a final solvent content of less than about 10 weight percent, less than about 9.75 weight percent, less than about 9.5 weight percent, less than about 9.25 weight percent, less than about 9 weight percent, less than about 8.75 weight percent, less than about 8.5 weight percent, less than about 8.25 weight percent, less than about 8 weight percent, less than about 7.75 weight percent, less than about 7.5 weight percent, less than about 7.25 weight percent, less than about 7 weight percent, less than about 6.75 weight percent, less than about 6.5 weight percent, less than about 6.25 weight percent, less than about 6 weight percent, less than about 5.75 weight percent, less than about 5.5 weight percent, less than about 5.25 weight percent, less than about 5 weight percent, less than about 4.75 weight percent, less than about 4.5 weight percent, less than about 4.25 weight percent, less than about 4 weight percent, less than about 3.75 weight percent, less than about 3.5 weight percent, less than about 3.25 weight percent, less than about 3 weight percent, less than about 2.75 weight percent, less than about 2.5 weight percent, less than about 2.25 weight percent, less than about 2 weight percent, less than about 1.75 weight percent, less than about 1.5 weight percent, less than about 1.25 weight percent, or even less than about 1 weight percent, based on the total weight of the coffee composition and/or structure present.

In one or more embodiments, the water content of the structured coffee composition may be described in reference to the water content of the ingredients used to form the structured coffee composition. In one or more embodiments, water content of the structured coffee composition may be within 15%, in other embodiments within 10%, and in other embodiments within 5% of the water content of the ground roast coffee employed to prepare the structured coffee composition. In still other embodiments, water content of the structured coffee composition may be within 15%, in other embodiments within 10%, and in other embodiments within 5% of the water content of the combination of the instant coffee and ground roast coffee (i.e. the percent of water in the combined amount of the instant coffee and ground roast coffee) employed to prepare the structured coffee composition. For example, if a structured coffee composition is prepared with a ground roast coffee and an instant coffee that both have an initial water content of 3%, the structured coffee composition may have a water content with 15% of 3% (i.e., 2.55% to 3.45%).

Coating Characteristics

As indicated above, the coated coffee particles include a coating that compositionally includes a mixture of the coffee extract(s) and extract(s) from the ground roast coffee. In one or more embodiments, the coating may be characterized by the mean thickness of the coating, which may be measured using electron microscopy and/or micro computed tomography (Micro CT). In one or more embodiments, the coated coffee particles may include a coating with a mean thickness of at least about 5 microns (μm), at least about 7.5 microns, at least about 10 microns, at least about 12.5 microns, at least about 17.5 microns, at least about 20 microns, at least about 22.5 microns, at least about 25 microns, at least about 27.5 microns, at least about 30 microns, at least about 32.5 microns, at least about 35 microns, at least about 37.5 microns, at least about 40 microns, at least about 42.5 microns, at least about 45 microns, at least about 47.5 microns, at least about 50 microns, at least about 52.5 microns, at least about 55 microns, at least about 57.5 microns, at least about 60 microns, at least about 62.5 microns, at least about 65 microns, at least about 67.5 microns, at least about 70 microns, at least about 72.5 microns, at least about 75 microns, at least about 77.5 microns, at least about 80 microns, at least about 82.5 microns, at least about 85 microns, at least about 87.5 microns, at least about 90 microns, at least about 92.5 microns, at least about 95 microns, at least about 97.5 microns, at least about 100 microns, at least about 102.5 microns, at least about 105 microns, at least about 107.5 microns, at least about 110 microns, at least about 112.5 microns, at least about 115 microns, at least about 117.5 microns, at least about 120 microns, at least about 122.5 microns, at least about 125 microns, at least about 127.5 microns, at least about 130 microns, at least about 132.5 microns, at least about 135 microns, at least about 137.5 microns, at least about 140 microns, at least about 142.5 microns, at least about 145 microns, at least about 147.5 microns, at least about 150 microns, at least about 152.5 microns, at least about 155 microns, at least about 157.5 microns, at least about 160 microns, at least about 162.5 microns, at least about 165 microns, at least about 167.5 microns, at least about 170 microns, at least about 172.5 microns, at least about 175 microns, at least about 177.5 microns, at least about 180 microns, at least about 182.5 microns, at least about 185 microns, at least about 187.5 microns, at least about 190 microns, at least about 192.5 microns, at least about 195 microns, at least about 197.5 microns, at least about 200 microns, at least about 202.5 microns, at least about 205 microns, at least about 207.5 microns, at least about 210 microns, at least about 212.5 microns, at least about 215 microns, at least about 217.5 microns, at least about 220 microns, at least about 222.5 microns, at least about 225 microns, at least about 227.5 microns, at least about 230 microns, at least about 232.5 microns, at least about 235 microns, at least about 237.5 microns, at least about 240 microns, at least about 242.5 microns, at least about 245 microns, at least about 247.5 microns, at least about 250 microns, at least about 252.5 microns, at least about 255 microns, at least about 257.5 microns, at least about 260 microns, at least about 262.5 microns, at least about 265 microns, at least about 267.5 microns, at least about 270 microns, at least about 272.5 microns, at least about 275 microns, at least about 277.5 microns, at least about 280 microns, at least about 282.5 microns, at least about 285 microns, at least about 287.5 microns, at least about 290 microns, at least about 292.5 microns, at least about 295 microns, at least about 297.5 microns, or even at least about 300 microns. In these or other embodiments, the coated coffee particles may include a coating with a mean thickness of at most about 325 microns, at most about 350 microns, at most about 375 microns, at most about 400 microns, at most about 425 microns, at most about 450 microns, at most about 500 microns, at most about 525 microns, at most about 550 microns, at most about 575 microns, at most about 600 microns, at most about 625 microns, at most about 650 microns, at most about 675 microns, at most about 700 microns, at most about 725 microns, at most about 750 microns, at most about 775 microns, at most about 800 microns, at most about 825 microns, at most about 850 microns, at most about 875 microns, at most about 900 microns, at most about 925 microns, at most about 950 microns, at most about 975 microns, at most about 1000 microns, at most about 1025 microns, at most about 1050 microns, at most about 1075 microns, at most about 1100 microns, at most about 1125 microns, at most about 1150 microns, at most about 1175 microns, at most about 1200 microns, at most about 1225 microns, at most about 1250 microns, at most about 1275 microns, at most about 1300 microns, at most about 1325 microns, at most about 1350 microns, at most about 1375 microns, at most about 1400 microns, at most about 1425 microns, at most about 1450 microns, at most about 1475 microns, or even about 1500.

In one or more embodiments, the coated coffee particles may include a coating with a mean thickness of about 5 microns to about 1500 microns, in other embodiments about 10 microns to about 1450 microns, in other embodiments about 20 microns to about 1400 microns, in other embodiments about 30 microns to about 1350 microns, in other embodiments about 40 microns to about 1300 microns, in other embodiments about 50 microns to about 1250 microns, in other embodiments about 60 microns to about 1200 microns, in other embodiments about 70 microns to about 1150 microns, in other embodiments about 80 microns to about 1100 microns, in other embodiments about 90 microns to about 1050 microns, in other embodiments about 100 microns to about 1000 microns, in other embodiments about 110 microns to about 950 microns, in other embodiments about 120 microns to about 900 microns, in other embodiments about 130 microns to about 850 microns, in other embodiments about 140 microns to about 800 microns, in other embodiments about 150 microns to about 750 microns, in other embodiments about 160 microns to about 700 microns, in other embodiments about 175 microns to about 600 microns, in other embodiments about 200 microns to about 550 microns, in other embodiments about 225 microns to about 500 microns, in other embodiments about 250 microns to about 450 microns, in other embodiments about 275 microns to about 400 microns, in other embodiments about 290 microns to about 350 microns, and in other embodiments about 300 microns to about 325 microns.

In one or more embodiments, the coating may be characterized by the amount of the surface of the coffee particle that is coated by the coating that includes a mixture of the brewed coffee extracts and extracts from the ground roast coffee. In one or more embodiments, the average surface area coverage of the coffee particle is in the range of about 50 percent to 100 percent, about 52.5 percent to 97.5 percent, or from about 55 percent to about 95 percent, or from about 57.5 percent to about 92.5 percent, or from about 60 percent to about 90 percent, or from about 62.5 percent to about 87.5 percent, or from about 65 percent to about 85 percent, or from about 67.5 percent to about 82.5 percent, or from about 70 percent to about 80 percent, or from about 72.5 percent to about 77.5 percent, or even about 75 percent of the exposed surface area of the coffee particle.

Composition Size and Configuration:

As indicated above, the coated coffee particle may be used in structured coffee composition. Although the structured coffee compositions may be made in any size and/or three-dimensional geometric shape, they are normally designed at least in some embodiments to produce a single standard serving of brewed coffee, or a whole multiple or major fraction of a single standard serving. For example, in some embodiments, the structured coffee compositions may be designed to produce whole multiples of a single standard serving, e.g., to produce two standard servings of brewed coffee or three standard servings. In other embodiments, an structured coffee may be made larger, to produce more than a single serving of coffee, and can optionally be designed with surface scoring to allow a user to break any coffee structure made from the one or more coffee compositions into smaller pre-designated portions (i.e., break a molded product/pellet in half or into fourths, etc.), and the individual portions could then be used to produce separate coffee servings. In other embodiments, the structured coffee compositions may be designed to produce a major fraction of a standard single serving such as one-half of a standard serving, or one-third of standard serving, or one-quarter of standard serving. The end user/consumer may add or reduce the number of coffee structures (e.g., pellets, molded products, etc.) to control strength of the brewed coffee to match their particular taste preference, to achieve brewed coffee that is weaker or stronger than normal. Since, in one embodiment, the structured coffee compositions may be designed to be dividable, any potentially desired ratio of coffee structures to standard coffee servings can potentially be achieved. See for example, as disclosed in U.S. Pat. Nos. 9,756,869; 9,603,376; 9,474,291; and 9,474,290, which disclose methods of adjusting the weakness or strength of a standard brewed coffee, the entire disclosures of all of these patents are incorporated herein by reference as though fully set forth herein in their entireties. Furthermore, about one (1) standard serving of coffee compositions or coffee structure product may make about one (1) cup of coffee; or about three (3) standard servings of coffee compositions or coffee structure product may make about two (2) to three (3) cups of coffee; or about four (4) standard serving of coffee compositions or coffee structure product may make about four (4) to seven (7) cups of coffee; or even about five (5) standard serving of coffee compositions or coffee structure product may make about eight (8) to twelve (12) cups of coffee.

Figure 2:
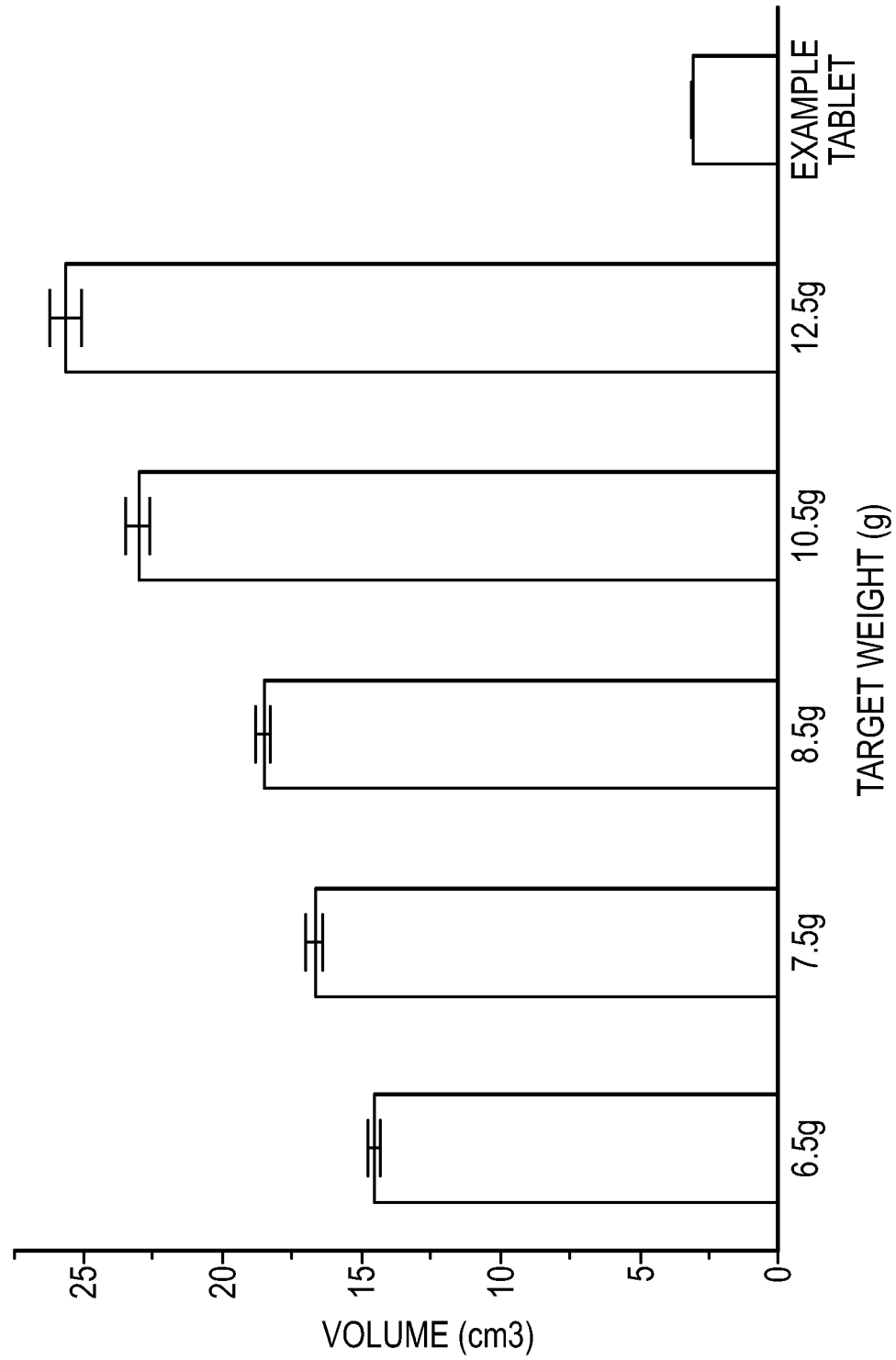
FIG. 2 is a graphical plot of the various volumes of three-dimensional structures of various examples of the present invention and including a comparative example of a tablet structure.

While not wishing to be bound to any one set of dimensions, the process and ingredients the structured coffee composition may have a cylindrical structure measuring about 29 mm to about 33 mm in diameter and about 19.5 mm to about 32 mm in thickness and about 14.0 cm3 to about 27.0 cm3 in volume, which can have variations thereabout as further described below and shown in FIG. 2, and Tables 2, 3, and 4. The diameter and thickness can have variations thereabout of plus or minus 0.1 mm to 2.0 mm.

In one or more embodiments, the structured coffee compositions may have a weight of 6.5 grams, about 7.5 grams, about 8.5 grams, about 10.5 grams, or even about 12.5 grams, which can have variations thereabout of plus or minus 0.1 grams to 0.5 grams. In other embodiments, the structured coffee compositions may have a weight of 13 grams, about 15 grams, about 17 grams, about 21 grams, or even about 25 grams, which can have variations thereabout of plus or minus 0.1 grams to 0.5 grams. In other embodiments, the structured coffee compositions may have a weight of 19.5 grams, about 22.5 grams, about 25.5 grams, about 31.5 grams, or even about 37.5 grams, which can have variations thereabout of plus or minus 0.1 grams to 0.5 grams. In other embodiments, the structured coffee compositions may have a weight of 26 grams, about 30 grams, about 34 grams, about 42 grams, or even about 50 grams, which can have variations thereabout of plus or minus 0.1 grams to 0.5 grams. Similarly, structured coffee compositions made with different dose sizes, e.g., a coffee product made to produce one-third of a standard serving of brewed coffee per structure or molded product, will also have correspondingly different sizes.

Different structure configurations for the structured coffee composition are also possible. For example, cylinder, cube, cuboid, sphere, pellet, ellipsoid, triangular pyramid, hexagonal prism, truncated triangular pyramid, truncated square pyramid, hexagonal pyramid, truncated hexagonal pyramid, cone, truncated cone, diamond, a three dimensional shape with an oval-shaped face, a three dimensional shape with heart-shaped face, a three dimensional shape with triangle-shaped face, or pillow shape are contemplated. Further, at least one side of a generally cylindrical molded structure can, if so desired, be concave or convex. Additionally, or alternatively, the outer surface of a structure or molded product can have ridges, bumps, surface scoring, or embossments. Further, the structured coffee compositions may be in the form of a particulate or an agglomeration of particles. See FIG. 1 for examples of structural shapes. It should also be noted that comparative examples are shown in some tables and figures herein, which can be labeled "Tablet Example". The comparative example, "Tablet Example", is a coffee tablet made using a multi-step compaction process as disclosed in U.S. Pat. Nos. 9,756,869; 9,603,376; 9,474, 291; 9,474,290, which these patent applications are hereby incorporated by reference as though fully set forth herein in their entirety.

Resistance to Staling

In one or more embodiments, the coated coffee particles or structured coffee compositions formed from the coated coffee particles may have a resistance to staling or a reduced perception of staling. Resistance to staling may be measured through the quantification of lipid oxidation byproducts, such as hexanal, that are known to be generated during coffee staling and contribute to the perception of stale coffee particulate or products. Reduced perception of staling in roasted coffee particulate or products by the end user (consumer) once brewed, can be measured though the use of a trained sensory panel calibrated to identify stale notes, such as "papery," in a coffee brew. Advantageously, the coated coffee particles may protect coffee flavor from one or more negative organoleptic effects, such as development of paper off-notes, of staling, especially those staling effects caused by lipid oxidation. In one embodiment, this is accomplished via the use of a coated coffee particulate or product (i.e., roasted and ground coffee or coffee structures formed from a roasted and ground coffee particulate or product that has been coated in any manner discussed herein) which may limit exposure of such a coffee particulate or product to environmental conditions that cause or result in enhanced lipid oxidation. In addition, the structured coffee compositions may minimize surface area to volume ratios for coffee particulate or products that will be exposed to oxidative forces, further minimizing lipid oxidation and staling thereof.

In one or more embodiments, staling may be determined by exposing coated coffee particles or structured coffee compositions formed from the coated coffee particles to UV light for a period of 4 days in a UV light box. After the exposure to UV light, the coffee particles or structured coffee compositions may be brewed and assessed by expert panelists for staling. The trained expert panelists score the staling of the coffee based on a scale from 1 (not stale) to 5 (very stale), where scores 3 or above are recognized as staling of the coffee samples. For example, the following descriptors apply to the scores: 1 (Not Stale); 2 (Very Slight Off Note); 3 (Slight Stale); 4 (Stale); and 5 (Very Stale). Further experimental details are included in the example section. The staling data may be reported along with the exposed surface area (i.e., the area of the surface that is exposed to light divided by the total volume of the coated coffee particles or structured coffee compositions. In one or more embodiments, when the structured coffee compositions have an exposed surface to area volume ratio of less than 0.5, the coated coffee particles or structured coffee compositions may be used to prepare a brewed coffee that achieves stale score of 1. Stated differently, the brewed coffee is perceived as not stale. In one or more embodiments, when the structured coffee compositions have an exposed surface to area volume ratio of less than 0.82, the coated coffee particles or structured coffee compositions may be used to prepare a brewed coffee that achieves stale score of 2. Stated differently the brewed coffee is perceived to have a very slight off note.

In one or more embodiments, staling may be determined by aging the coffee under UV lights and testing determining the hexanal content. The coffee may be aged by exposing coated coffee particles or structured coffee compositions formed from the coated coffee particles to UV light for a period of 7 days. After the exposure to UV light, the coffee particles or structured coffee compositions may be brewed and the amount of hexanal may be determined. Further experimental details are included in the example section. In one or more embodiments, the amount of hexanal after a week of exposure of light in the coated coffee particles may be less than 40 ng/g, in other embodiments less than 35 ng/g, in other embodiments less than 30 ng/g, other embodiments less than 25 ng/g, and in other embodiments less than 35 ng/g.

Packaging and Use:

The coated coffee particles are intended to be provided to the customer, both consumers and commercial/industrial users, in suitable packages and/or packaging. In one or more embodiments, the coated coffee particles may be provided in a package as a plurality of coated coffee particles. In other embodiments, the coated coffee particles may be bound together as a structured coffee composition. Due to the resistance to staling of the coated coffee particles, they allow for reduction of packaging materials and lowers packaging cost. Many types of packages and packaging material can be used for this purpose including bags made from plastic, paper, foil, cellophane or other suitable material; woven and nonwoven filter paper, a nylon mesh material, boxes made from cardboard, rigid plastic, foamed plastic, etc.; bottles, sleeves, etc. Combinations of these packages can also be used. Moreover, the instant coated slurry and/or liquid coffee concentrate can even be used to coat the inside of a package or packaging material for the coffee compositions and/or coffee structures thereof.

The packaging for the coated coffee particles may be designed to be resealable for the convenience of the customer. In such a configuration, as the coated coffee particles are periodically used by the consumer, the unused coated coffee particles that remain could be resealed in the package to retain product freshness.

If desired, in embodiments where the coated coffee particles are used in structured coffee compositions, the structured coffee compositions may be packaged in any desired number so that each packaged amount can be designed to yield any desired number of brewed coffee servings and/or strengths. For example, structured coffee compositions are in one embodiment designed to produce a single serving of coffee per coffee composition and/or structures thereof can be packaged individually to facilitate making one cup of coffee in a single brew, in groups of two to facilitate making two cups of coffee in a single brew, in groups of three to facilitate making three cups of coffee in a single brew, in groups of four to facilitate making four cups of coffee in a single brew cycle and so forth up to groups of twelve to facilitate making twelve cups of coffee in a single brew. The structured coffee compositions may be packaged with more or less of the same to produce stronger or weaker coffee for a standard brew of coffee since, in one embodiment, the coffee structures (e.g., pellets, molded products, etc.) can be designed to be dividable, any potentially desired ratio of coffee structures to standard coffee servings can potentially be achieved. Furthermore, in yet other embodiments designed to produce a single serving of coffee per structured coffee composition can be packaged individually as structured coffee composition to facilitate making one cup of coffee in a single brew, or can be packaged in a group of three (3) structured coffee compositions to facilitate making about two (2) to three (3) cups of coffee; or can be packaged in a group of about four (4) structured coffee compositions to facilitate making about four (4) to seven (7) cups of coffee; or can be packaged in a group of even about five (5) structured coffee compositions coffee to facilitate making about eight (8) to twelve (12) cups of coffee.

One advantage is that two or more structured coffee compositions may be, via two different coffee compositions or structures formed from each respective different structured coffee composition, combined in the same brew to produce a preferred brew in which the one or more properties resulting from the combination of different coffee compositions or structures provide a desired variation, change or combination in flavor, strength, caffeine content, or other such characteristic in the preferred brew. A wide variety of types of structured coffee compositions can be provided together in a pre-packaged kit, or in a consumer selected array, to facilitate preparation of a preferred brew specific to an individual consumer's preferences. As such, an exemplary kit may include a plurality of varied structured coffee compositions, with at least two of the varied structured coffee compositions having a different predetermined property, such as, for example, amount or type of flavorant, caffeine content, level of acidity, darkness of roast, species of coffee, or type, of coffee bean treatment. Such a kit can be provided with instructions for combining the two or more types of coffee composition to prepare a desired brewed coffee. These instructions may include one or more "recipes" for preparing one or more special predetermined blends of coffee. The present invention may be packaged as coffee compositions (if in loose powdered form) and/or as an appropriate number of structured coffee compositions. See various methods of packaging and use of coffee compositions and products as disclosed in U.S. Pat. Nos. 9,756,869; 9,603,376; 9,474,291; 9,474,290, which these patent applications are hereby incorporated by reference as though fully set forth herein in their entirety.

Structured Coffee Composition Properties:

In accordance with the present invention, the structured coffee compositions are made in such a way that they disintegrate essentially immediately (or at least very rapidly) when contacted with brewing water of a desired and/or suitable temperature (any temperature could be used, for example in the range of 1° C. to 100° C., as both hot and cold coffee brews are desirable) at the beginning of the brewing cycle, as indicated herein.

Figure 3A:
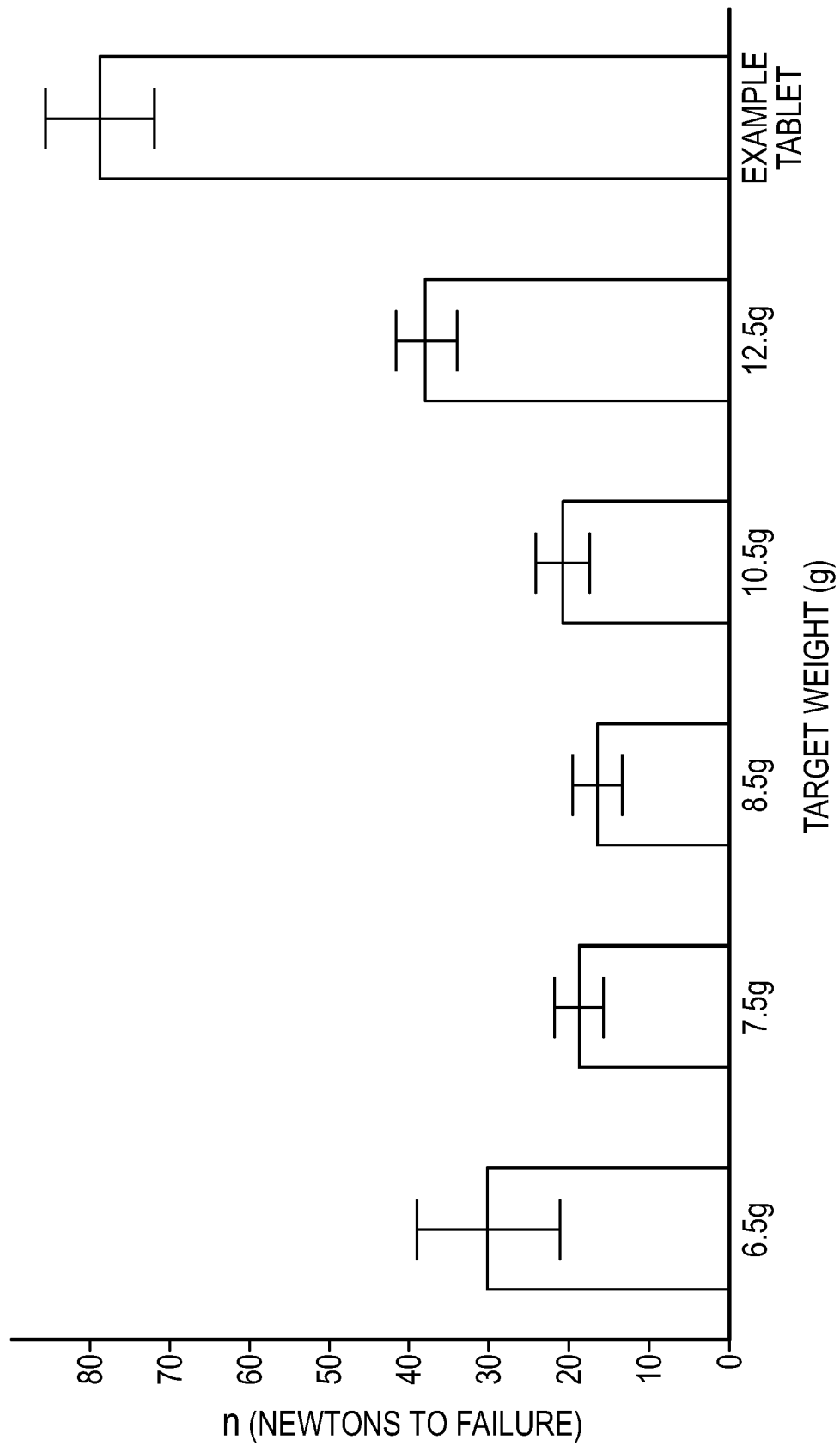
FIG. 3A is another graphical plot of the hardness of various examples of the present invention when tested by breaking the structure across its diameter and including a comparative example of a tablet structure.
Figure 3B:
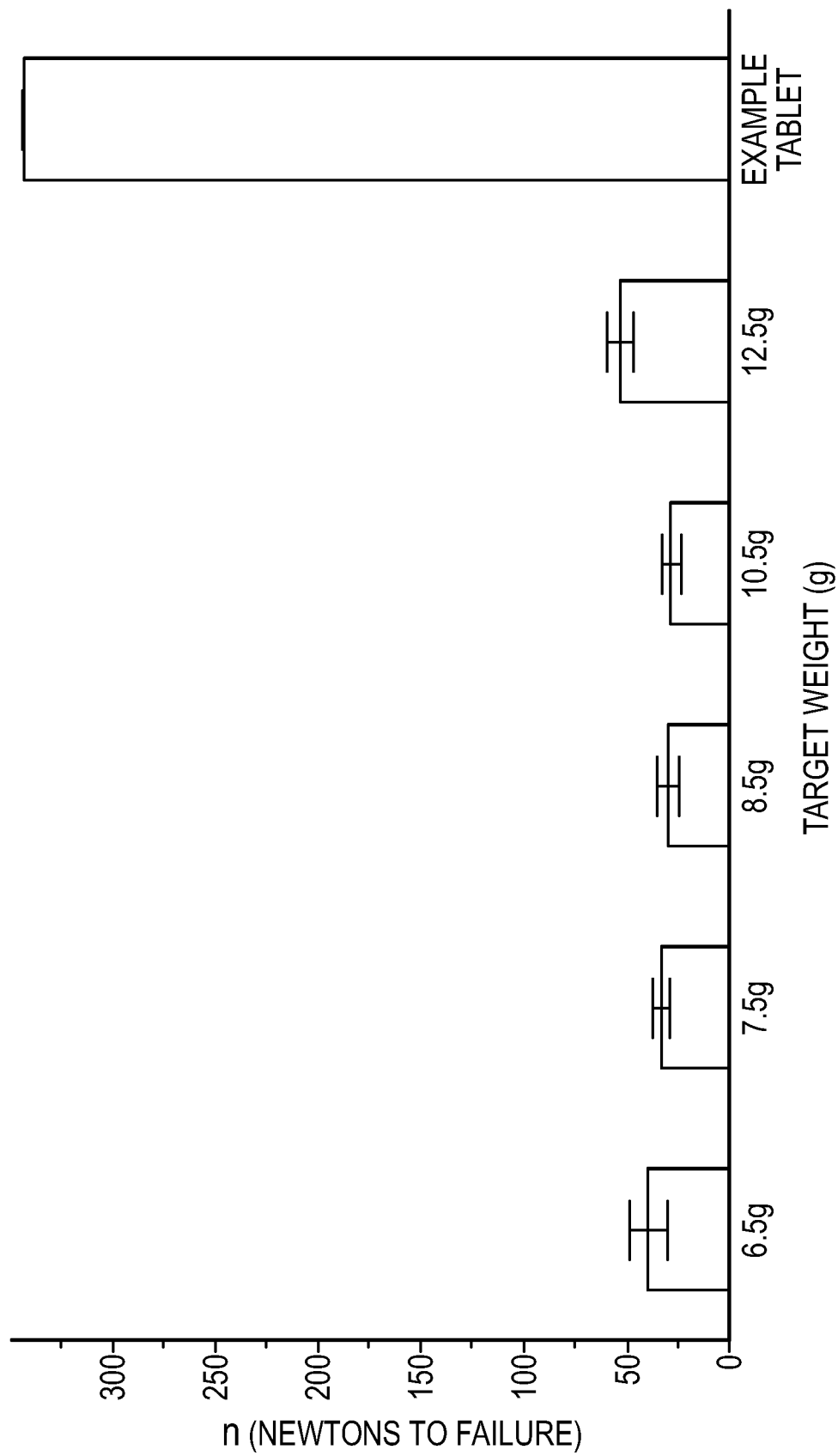
FIG. 3B is another graphical plot of the hardness various examples of the present invention when tested by breaking the structure across its height and including a comparative example of a tablet structure.

The strength/robustness of the structured coffee compositions may conveniently be measured in several ways, two examples of which include measuring a product's hardness and friability. Hardness measures the force required to break the structure in an axial direction over the height of the structure or across the diameter over the radial or longitudinal direction of the structure. Product hardness can be determined by a diametral compression test in which the structure is placed between two anvils and a pressure is applied to the anvils until the structure breaks. The crushing strength that just causes the structure to break is taken as the hardness of the structure, which is sometimes referred to as the "structure crushing strength." The hardness of an article can be determined using any number of devices and techniques known to skilled coffee professionals, including, for example, the Stokes (Monsanto) tester, the Strong-Cobb tester, the Pfizer tester, the Erweka tester, the Heberlein (or Schleuniger) tester, the Key tester, the Varian VK200 Tablet Hardness tester, and the Van der Kamp tester, and the techniques associated with each of these devices. As shown in Table 2 below and FIGS. 3A and 3B, the structured coffee compositions may be made to have a hardness with a structure crushing strength over the height or axial direction of the structure in the range of about 21.3 N (Newtons) to about 61.7 N, when measured using a Varian VK200 Tablet Hardness tester set in the N (Newton) mode. Hardnesses in the range of about 20 N to about 65 N, about 22.5 N to about 62.5 N, about 25 N to about 60 N, about 27.5 N to about 57.5 N, about 30 N to about 55 N, about 32.5 N to about 52.5 N, about 35 N to about 50 N, about 37.5 N to about 47.5 N, about 40 N to about 45 N or even about 42.5 N. The structured coffee compositions may be made to have a hardness with a structure crushing strength over the across the diameter over the radial or longitudinal direction of the structure in the range of about 11.1 N (Newtons) to about 51.6 N, when measured using a Varian VK200 Tablet Hardness tester set in the N (Newton) mode. Hardnesses in the range of about 10 N to about 52.5 N, about 12.5 N to about 50 N, about 15 N to about 45 N, about 17.5 N to about 42.5 N, about 20 N to about 40 N, about 20 N to about 37.5 N, about 22.5 N to about 35 N, about 25 N to about 32.5 N, or even about 30 N.

TABLE 2

| Target Weight | Measurement | Height (mm) | Diameter (mm) | Mass (g) | Surface Area (cm²) | Volume (cm³) | Density (g/cm³) | N (Newtons to failure) |
|---|---|---|---|---|---|---|---|---|
| 6.5 g | Diameter | 19.67 | 30.77 | 6.56 | 33.9 | 14.6 | 0.45 | 19 |
| 6.5 g | Diameter | 19.87 | 30.68 | 6.59 | 33.9 | 14.7 | 0.45 | 51.6 |
| 6.5 g | Height | 19.83 | 30.57 | 6.56 | 33.7 | 14.6 | 0.45 | 61.5 |
| 6.5 g | Height | 19.93 | 30.34 | 6.49 | 33.5 | 14.4 | 0.45 | 31.1 |
| 10.5 g | Diameter | 28.40 | 32.23 | 10.48 | 45.1 | 23.2 | 0.45 | 25.5 |
| 10.5 g | Diameter | 28.42 | 32.35 | 10.51 | 45.3 | 23.4 | 0.45 | 15.6 |
| 10.5 g | Height | 28.56 | 31.72 | 10.51 | 44.3 | 22.6 | 0.47 | 21.3 |
| 10.5 g | Height | 28.05 | 31.37 | 10.47 | 43.1 | 21.7 | 0.48 | 34.2 |
| 8.5 g | Diameter | 23.86 | 31.60 | 8.49 | 39.4 | 18.7 | 0.45 | 11.1 |
| 8.5 g | Height | 24.24 | 31.36 | 8.50 | 39.3 | 18.7 | 0.45 | 22.1 |
| 8.5 g | Height | 23.51 | 31.61 | 8.45 | 39.0 | 18.5 | 0.46 | 37.8 |
| 7.5 g | Diameter | 21.78 | 30.91 | 7.5 | 36.2 | 16.3 | 0.46 | 23.3 |
| 7.5 g | Diameter | 21.72 | 31.37 | 7.48 | 36.9 | 16.8 | 0.45 | 13 |
| 7.5 g | Height | 21.08 | 31.33 | 7.52 | 36.2 | 16.3 | 0.46 | 26.6 |
| 7.5 g | Height | 21.96 | 31.05 | 7.53 | 36.6 | 16.6 | 0.45 | 40.3 |
| 12.5 g | Diameter | 31.62 | 32.32 | 12.56 | 48.5 | 25.9 | 0.48 | 43.4 |
| 12.5 g | Diameter | 32.35 | 32.54 | 12.55 | 49.7 | 26.9 | 0.47 | 31.1 |
| 12.5 g | Height | 31.58 | 32.66 | 12.52 | 49.2 | 26.5 | 0.47 | 42.5 |
| 12.5 g | Height | 31.29 | 31.98 | 12.52 | 47.5 | 25.1 | 0.50 | 61.7 |
| Tablet Example | Diameter | 5.94 | 25.59 | 2.74 | 15.1 | 3.1 | 0.90 | 67.7 |
| Tablet Example | Diameter | 5.97 | 25.59 | 2.86 | 15.1 | 3.1 | 0.93 | 92.1 |
| Tablet Example | Height | 6.02 | 25.58 | 2.80 | 15.1 | 3.1 | 0.91 | 343 |
| Tablet Example | Height | 5.81 | 25.55 | 2.62 | 14.9 | 3.0 | 0.88 | 343 |

Figure 4:
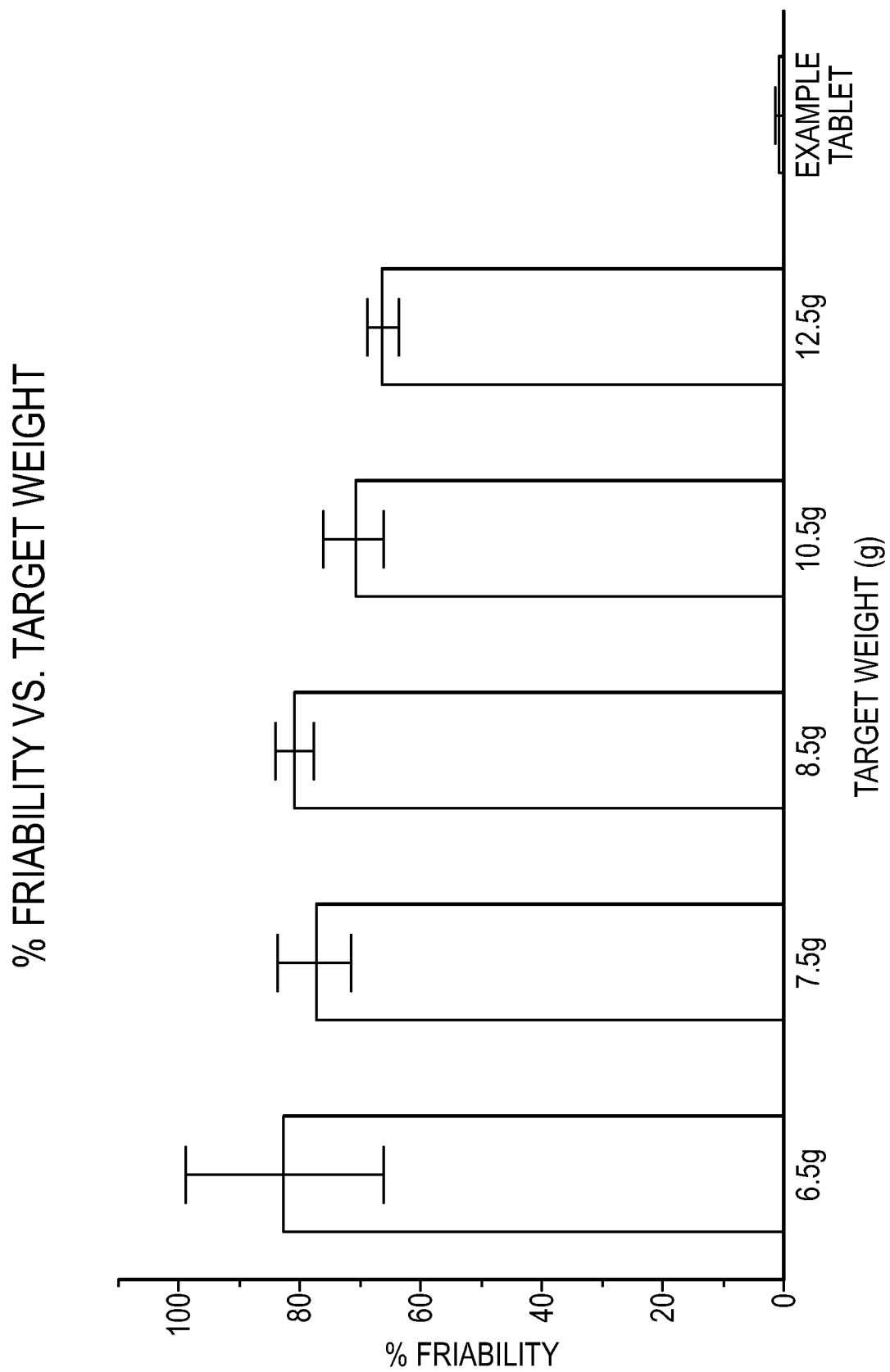
FIG. 4 is another graphical plot of the percent friability of various examples of structured coffee compositions and including a comparative example of a tablet structure.
Figure 5:
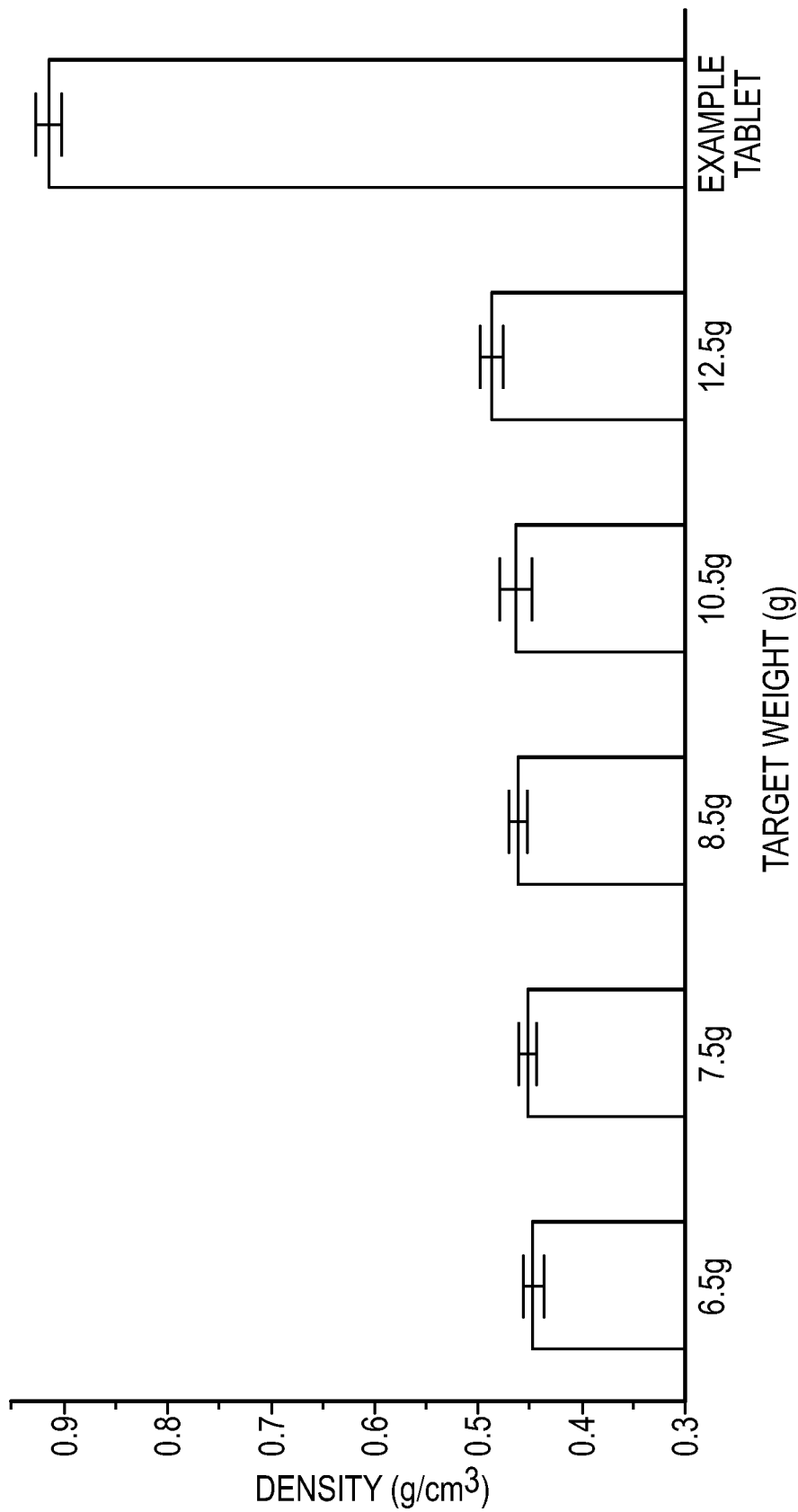
FIG. 5 is a graphical plot of the density of various examples of the structured coffee compositions and including a comparative example of a tablet structure.
Figure 6:
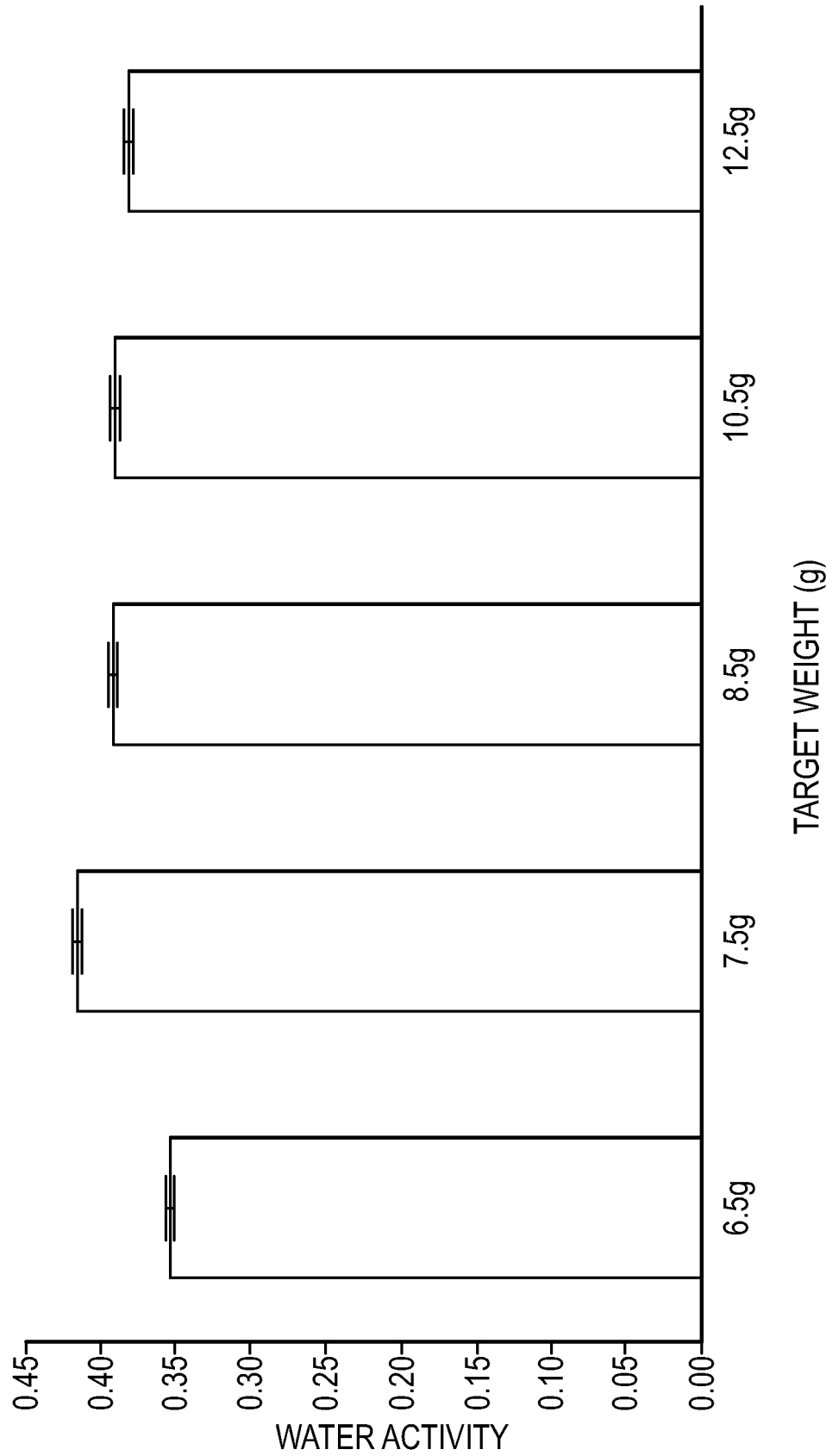
FIG. 6 is a graphical plot of the water activity versus target weight of various examples of the present invention.

Friability measures the amount of material that flakes, falls, or chips off the structures after being tumbled under a predetermined set of conditions. For convenience, the friability of the structured coffee compositions can be measured using a commercially-available Varian Friabilator having a dual chamber friability drum by rotating the structure in the drum of the machine for 100 revolutions at a rate of 25 rpm and then determining the amount of these structures that passes through a #4 American Standard Wire Mesh screen. The structures should not be broken to obtain the weight of the structure in grams, but adjust the number of whole structures to come as close as possible to weight of the structure in grams. The weight of material passing through this screen in proportion to the total weight of the original charge of structures represents the friability of these structures. As shown in Table 3 below and in FIG. 4, it has been found that the structured coffee compositions, can have a friability in the range of about 50 to 55 percent to about 100 percent (total disintegration of the coffee structure), of about 57.5 percent to about 97.5 percent, of about 60 percent to about 95 percent, of about 62.5 percent to about 92.5 percent, of about 65 percent to about 90 percent, of about 67.5 percent to about 87.5 percent, of about 70 percent to about 85 percent, of about 72.5 percent to about 82.5 percent, of about 75 percent to about 80 percent, or even about 77.5 percent.

ground roast coffee (e.g., the ground roast coffee used to prepare the structured coffee composition) is normally greater than about 1 and in many instances greater than about 1.1, greater than about 1.2, greater than about 1.25, greater than about 1.5, greater than about 1.75, greater than about 2, greater than about 2.25, greater, than about 2.5, greater than about 2.75, and even about 3 on a weight basis.

TABLE 3

| Target Weight (g) | Sample No. | Chamber | Whole Mass (g) | End Mass (g) (retained in #4 screen) | Percent Friability | Diameter mm | Height mm | Volume (cm³) | Density (g/cm³) |
|---|---|---|---|---|---|---|---|---|---|
| 6.5 | 3 | 1 | 6.32 | 0.00 | 100 | 30.56 | 20.20 | 14.8 | 0.43 |
| 6.5 | 5 | 1 | 6.47 | 2.12 | 67 | 30.59 | 19.61 | 14.4 | 0.45 |
| 10.5 | 4 | 2 | 10.56 | 3.79 | 64 | 32.01 | 27.76 | 22.3 | 0.47 |
| 10.5 | 6 | 2 | 10.53 | 2.15 | 80 | 32.08 | 27.75 | 22.4 | 0.47 |
| Tablet Example | 1 | 1 | 2.86 | 2.86 | 0 | | | | |
| Tablet Example | 7 | 1 | 2.69 | 2.61 | 3 | | | | |
| 12.5 | 5 | 1 | 12.54 | 4.76 | 62 | 31.66 | 30.92 | 24.3 | 0.52 |
| 12.5 | 8 | 2 | 12.49 | 3.68 | 71 | 32.55 | 31.69 | 26.4 | 0.47 |
| 8.5 | 9 | 1 | 8.54 | 1.07 | 88 | 31.50 | 23.53 | 18.3 | 0.47 |
| 7.5 | 2 | 2 | 7.54 | 1.18 | 84 | 31.38 | 21.89 | 16.9 | 0.45 |
| 7.5 | 7 | 1 | 7.52 | 2.41 | 68 | 31.29 | 21.48 | 16.5 | 0.46 |

TABLE 4

| Final Weight (g) | Number of Samples | Mean Water Activity Value | Minimum Value Percent | Maximum Value | Range |
|---|---|---|---|---|---|
| 6.5 | 10 | 0.36 | 0.35 | 0.40 | 0.05 |
| 7.5 | 10 | 0.42 | 0.41 | 0.42 | 0.01 |
| 8.5 | 10 | 0.39 | 0.39 | 0.40 | 0.01 |
| 10.5 | 10 | 0.39 | 0.01 | | 0.40 |
| 12.5 | 10 | 0.38 | 0.38 | 0.38 | — |

In one or more embodiments, the coated coffee particles may be characterized by a water activity. Water activity may be determined using a water activity meter such as a Rotronic Hygrolab Water Activity Meter. In one or more embodiments, the coated coffee particles may have a water activity of about 0.35 to about 0.42, about 0.36 to about 0.41, about 0.37 to about 0.40, and to about 0.38 to about 0.39, or even about 0.385. Furthermore, generally speaking, and as shown in Table 4 (water activity data) above, structured coffee compositions having the above combination of properties of about stated values and/or within claimed ranges for hardness, friability, and density within the diameter and height measurements and the about stated target weights may have a water activity of about 0.35 to about 0.42, about 0.36 to about 0.41, about 0.37 to about 0.40, and to about 0.38 to about 0.39, or even about 0.385.

It has been further found that the coated coffee particles achieve a greater total extraction of coffee solids during brewing as compared to an otherwise conventional ground roast coffee composition. That is to say, the total amount of coffee solids extracted and recovered in the brewed coffee product obtained is greater when the coated coffee particles are used in a typical ADC coffee maker or other brewing devices than when the same amount of conventional ground roast coffee is used in the same coffee maker. Yield ratios provided by the structured coffee compositions, i.e., the ratio of the coffee solids recovered from brewing the structured coffee compositions relative to the coffee solids recovered from brewing a substantially equal amount of conventional As discussed herein, various particle sizes for the roast and ground coffee may be used, which may result in various percent brew solids, density, and percent porosity in the molded product. Porosity is measured by Micro-CT (also called microtomography or micro-computed tomography). In one or more embodiments, the percent porosity (i.e., percent of total volume) in the structured coffee compositions may greater than 40%, greater than 42.5%, greater than 45% or greater than 47.5%, or greater than 50%, or greater than 52.5%, or greater than 55%, or greater than 57.5%, or greater than 60%. In one or more embodiments, the percent porosity in the structured coffee compositions may range between from about 40% to about 80%, or from about 42.5% to about 77.5%, or from about 45% to about 75%, or from about 47.5% to about 72.5%, or from about 50% to about 70%, or from about 52.5% to about 67.5%, or from about 55% to about 65%, or from about 57.5% to about 62.5%, or even about 60%.

In light of the above, when a standard serving of coffee is prepared the percent brew solids achieved by the structed coffee compositions are in the range of about 0.90 weight percent to about 3.00 weight percent, or from about 0.95 weight percent to about 2.95 weight percent, about 1.00 weight percent to about 2.9 weight percent, or from about 1.05 weight percent to about 2.85 weight percent, or from about 1.10 weight percent to about 2.80 weight percent, about 1.15 weight percent to about 2.75 weight percent, or from about 1.20 weight percent to about 2.70 weight percent, about 1.25 weight percent to about 2.65 weight percent, about 1.30 weight percent to about 2.60 weight percent, about 1.35 weight percent to about 2.55 weight percent, about 1.40 weight percent to about 2.50 weight percent, about 1.45 weight percent to about 2.45 weight percent, about 1.50 weight percent to about 2.40 weight percent, about 1.55 weight percent to about 2.35 weight percent, about 1.60 weight percent to about 2.30 weight percent, about 1.65 weight percent to about 2.25 weight percent, about 1.70 weight percent to about 2.20 weight percent, about 1.75 weight percent to about 2.15 weight percent, about 1.80 weight percent to about 2.10 weight percent, about 1.85 weight percent to about 2.05 weight percent, about 1.90 weight percent to about 2.00 weight percent, or even about 1.95 weight percent, based on the weight of the coffee brewed. For measurement of the percent (%) brew solids (% BS) used herein, the refractive index (RI) is measured using Bellingham Stanley RFM 340+. RI is the raw data value that is generated by the refractometer, it is used to calculate percent (%) brew solids. Then a linear regression equation is developed and used to correlate the RI to % BS.

The coated coffee particles and structured coffee compositions prepared from the coated coffee particles coated coffee particles disassociate and brews rapidly in both room temperature and cold water applications when used for cold brew coffee, which is shown in Table 5. The present invention disassociates in hot water (196.5-202° F.) in about 15 to about 21 seconds, in room temperature water (72-72.3° F.) in about 1 minute 7 seconds to about 1 minute 24 seconds, and in cold water (38.7-42.3° F.) in about 2 minutes 51 seconds to about 4 minutes 12 seconds. While the coated coffee particles may be brewed by any conventional means, the coated coffee particles, when used for quick cold brew coffee provides a bold cold brew coffee strength to remain bold when served over ice. It uses less coffee and brews in a shorter time frame than conventional cold brew formulations to provide a consistent brew.

TABLE 5

| Trial | Water Temp (° F.) | Structure Weight (g) | Dissociation Time (min:sec) | Average Dissociation Time (min:sec) |
|---|---|---|---|---|
| Hot (196.5-202° F.) | 198 | 8.49 | 0:17 | |
| Hot | 196.5 | 8.44 | 0:21 | |
| Hot | 202 | 8.45 | 0:15 | 0:17 |
| Room (72-72.3° F.) | 72.3 | 8.49 | 1:07 | |
| Room | 72 | 8.44 | 1:17 | |
| Room | 72.1 | 8.48 | 1:24 | 1:16 |
| Cold (38.7-42.3° F.) | 40.7 | 8.47 | 2:51 | |
| Cold | 38.7 | 8.47 | 4:12 | |
| Cold | 42.3 | 8.47 | 4:03 | 3:42 |

Sensory Panel Example: A sensory panel is conducted to position the present inventive coffee composition as compared to conventional roast and ground and instant coffee compositions. The follow list of coffee products are used to produce the various coffee brews tested by the panelists: (a) Folgers Classic Roast and Ground at standard drop weight (30.5 grams) (FOL 30.5 grams); (b) Folgers Classic Roast and Ground at drop weight matching the present invention composition drop weight (34.0 grams) (FOL 34 grams); (c) Present Invention (4×8.5 gram structures)–80 percent Folgers Classic Roast and Ground+20 percent Colcafe Instant (Invention); (d) Folgers Instant Crystals (14.2 grams) (Fol Inst); and (e) Colcafe Instant (14.2 grams)–Low Yield High Quality Instant (Colcafe).

Figure 7:
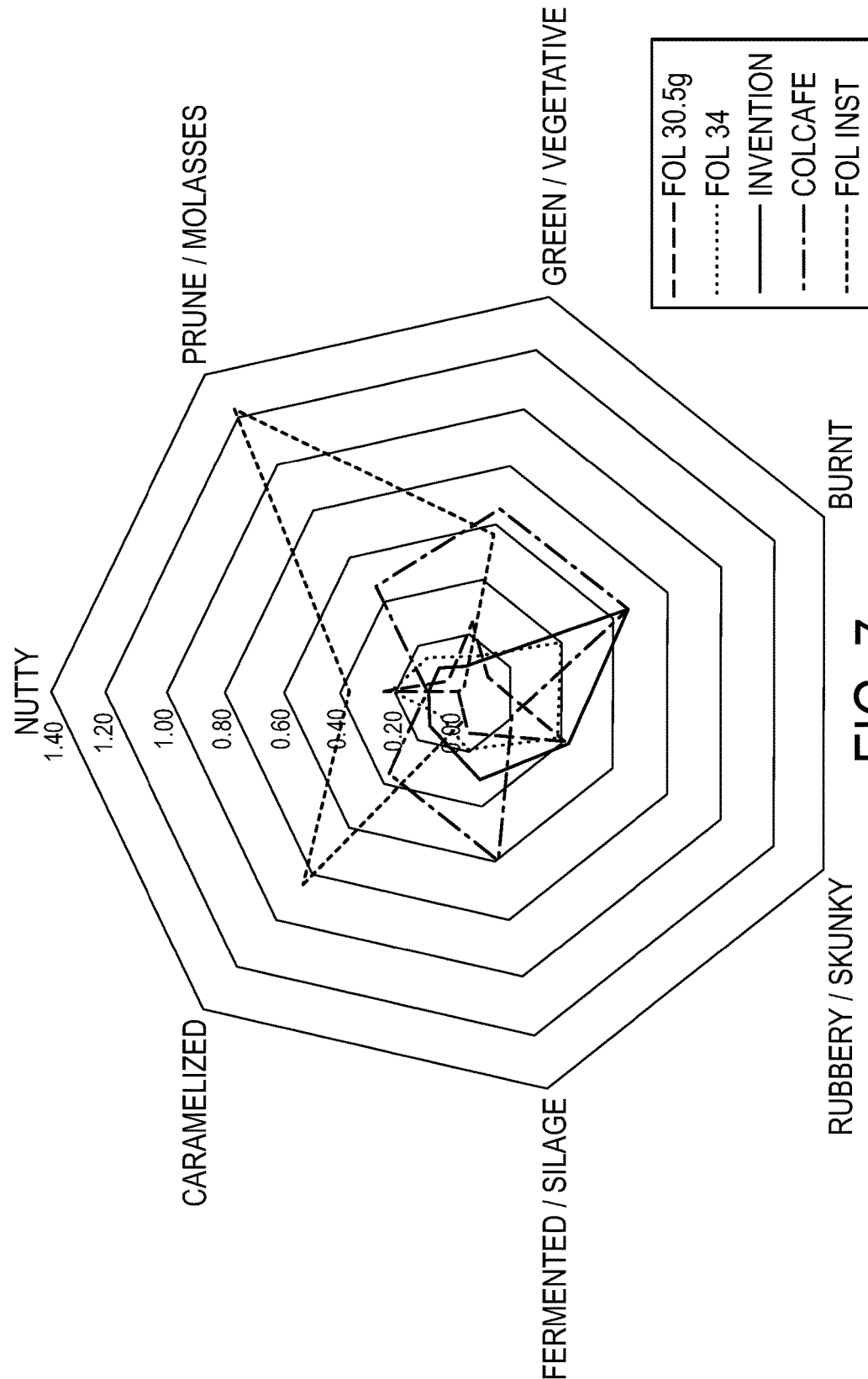
FIG. 7 is a graphical plot of low intensity attributes as measured by a sensory panel of various coffee compositions including the present invention

All products are brewed in Mr. Coffee ADC brewers in 1420 mL H2O at a temperature of about 157° F. +/−1° F. The panels are run blind and randomized. These products are evaluated and compared over a number of different coffee flavor attributes. It is determined that the coated coffee particles produce a brewed coffee that has the most coffee "Body," such as heaviness, mouthfeel, consistency, and/or weight as it coated the tongue of the panelists. Further, Body, is the feeling of the consistency of the liquid related to the amount of extraction of the solids or any other additives that increase the viscosity (References: heaviness on tongue, fullness of mouthfeel). As shown in FIGS. 7 and 8, the coated coffee particle closely tracks the attributes of a conventional roast and ground coffee (both Folgers Classic roast and ground coffees) even with a mixture of instant coffee therein with the roast and ground.

Working Examples:

Proof of UV Treatment as an Accelerant to Induce Staling: A validation experiment is conducted to evaluate the efficacy of UV treatment to accelerate staling. This experiment evaluates the degree of difference (DOD) of brewed coffee flavor from a sealed control. The treatments include coffee placed on a foil lined tray subjected to UV aging, coffee placed on a foil lined tray and left in the dark, coffee left enclosed in its original canister after opening, and coffee left sealed in its original canister without opening. At the beginning of the experiment, ten cans of Folgers Classic Roast coffee are procured from a local grocery store (Buehler's, Orrville, OH). All cans are within their use by dates at time of evaluation. All cans are subjected to oxygen measurement before opening to ensure fresh coffee. Four randomly selected cans are opened and 29.5 gram lots of roast and ground coffee from each can are placed in a thin layer on two foil lined service trays (number of tray samples=8 trays total). Four of these trays are placed under UV lights, four are placed in dark in laboratory drawers. After coffee samples are distributed, the cans from which they came are then closed with their manufacture supplied lids and placed in a dark drawer at room temperature for storage. Finally, one tray of 29.5 grams of instant coffee (Folger's) is placed under UV light as well. Coffee samples are evaluated against a sealed reference at one, four and eleven days of storage. On the final day, the instant coffee is included in the evaluation. Degree of difference is scored internally by expert cuppers on the following scale: 0.2 no difference; 0.3 very slight difference; 0.5 slight difference; 0.8 moderate difference; and 1.2 large difference.

Results: It is found that coffee stored under UV light is noticeably stale after one day of aging and is moderately to very different in flavor from a sealed control by day four. By day eleven, coffee stored under UV light and in the dark on trays are both moderately to very different from sealed controls and classified as stale (See Table 6 below). These results indicate that UV light treatment does accelerate the aging process. It also highlights that the sensory qualities produced by UV staling are the same as encountered in coffee samples that stale in the dark, supporting the theory that both UV exposed and non-UV exposed samples are undergoing similar aging reactions, but at different rates. Table 6 below discloses average degree of difference (DOD) scores for coffee stored under different conditions and illustrates that UV light rapidly accelerated the aging process.

TABLE 6

| Treatment | Average DOD*- Day One | Average DOD*- Day Four | Average DOD*- Day Eleven |
|---|---|---|---|
| Open Can | 0.26 | 0.3 | 0.3 |
| Coffee on Dark Tray | 0.26 | 0.33 | 0.8 |
| Coffee on UV-exposed Tray | 0.5 | 0.93 | 1.2 |
| Instant Coffee on UV-exposed Tray | — | — | 0.2 |

*Taste DOD

Staling Experiment: This experiment is designed to examine the protective effects of the present invention's coating treatment/method on coffee staling. The experiment examines four product forms all using an 80:20 weight percent mix of roast and ground coffee to instant coffee: (a) roast and ground coffee/instant coffee dry mix; (b) roast and ground coffee/instant coffee mix according to the inventive process discussed herein using water in the form of a three-dimensional coffee structure; (c) roast and ground coffee/instant coffee mix according to the inventive process discussed above using water in the form of a loose unformed particulate; and (d) flaked roast and ground coffee with instant in a dry mix. Evaluations are carried out using two different instant coffees, a high yield regular instant Folgers (RIF) pre-agglomeration and a high quality Colombian instant coffee from Coleafé. The experiment is set up as a randomized block design with five blocks containing three replicates of each of the four coffee forms disclosed above. At the start of the experiment, the first block is subjected to in initial evaluation before aging (Time (T)=0 days). After the initial assessment, the remaining blocks are placed under UV lights. Additional samples are evaluated at one, four and seven days. On sampling days, a block is chosen at random for evaluation. Coffee from the selected block is brewed (34 grams coffee to 1420 grams water) on an ADC brewer and subjected to sensory and chemical evaluation. Samples are subjected to sensory evaluation using a trained sensory panel (no. of evaluators=9 to 11 evaluators per tasting). Panelists assign each coffee a "papery" flavor score from 0 (no papery) to 10 (extremely high papery) as a measure for staleness. Before submitting coffee samples for sensory analysis, two 5.0 mL aliquots of each brew are collected for monitoring of chemical markers for lipid oxidation, including hexanal. Before analysis, deuterated hexanal is added to each vial as an internal standard. Hexanal levels are measured by purge and trap GC/MS (PT-GC/MS). Finally, samples from each treatment in each block are saved for imaging using environmental scanning electron microscopy (ESEM).

Results: It is found that there is a significant reduction in both staling flavor and the chemical marker for staling (hexanal) in the formed coffee structures of item (b) above versus all other treatments for both instant types (see FIGS. 9A and 9B). There is no difference between the un-formed three-dimensional coffee structures (item (c) above) and the roast and ground/instant mix control (Item (d) above). It is further determined that the exposed surface of the three-dimensional coffee structure of item (b) above has a significantly higher level of hexanal per gram dry coffee than the core of the structure (see FIG. 10). This suggests a surface area effect for protecting the coffee from staling. It is found that a coating of instant coffee is formed on individual roast and ground coffee particles during the methods of the present invention using water as described herein. However, it is also found that the coating of the roast and ground coffee particles is uneven, leaving some areas with no instant coffee coating (see FIGS. 11A, 11B and 11C).

Figure 9B:
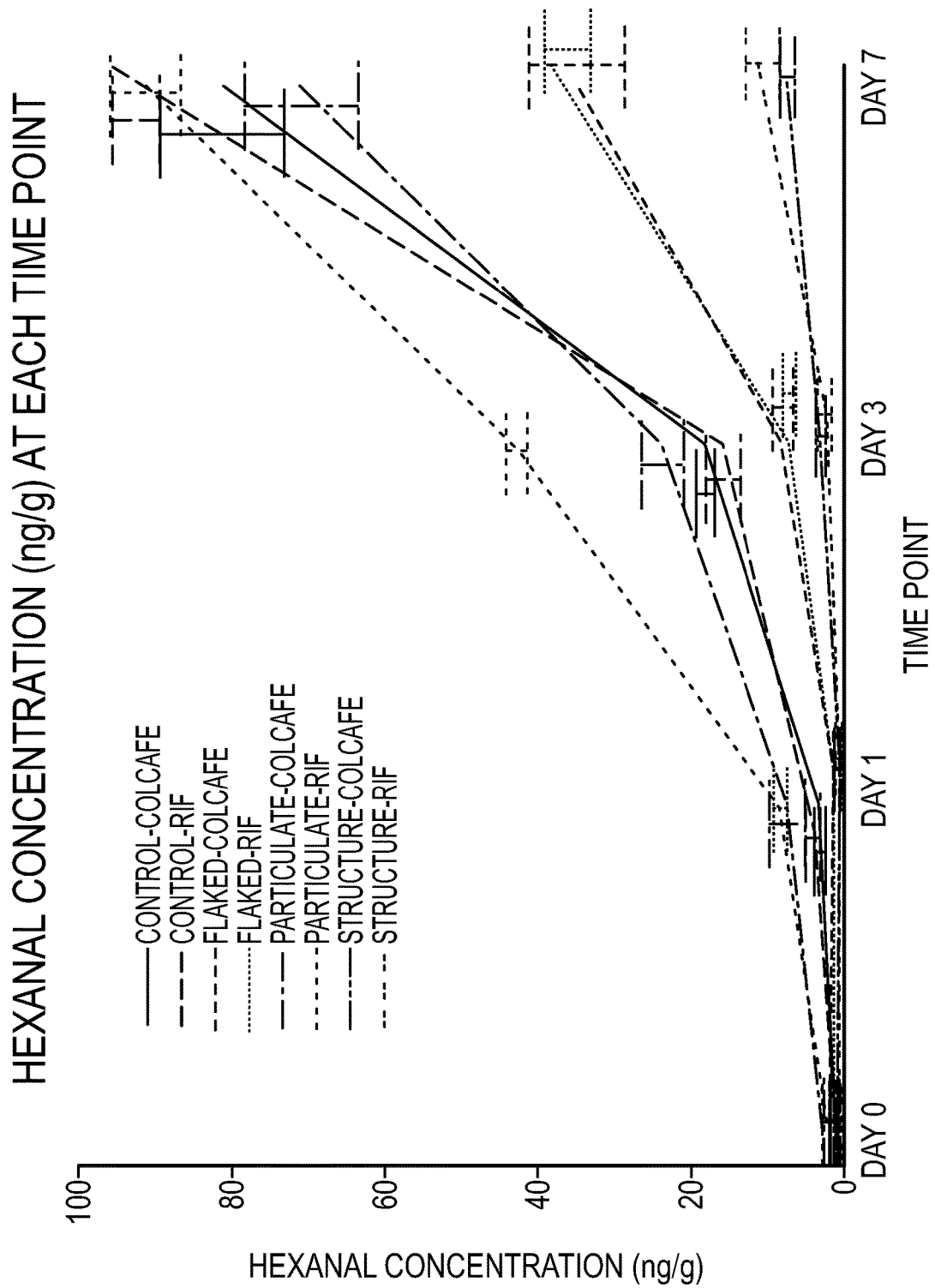
FIG. 9B is a graph illustrating that the three-dimensional coffee structures of item (b) have significantly lower (ANOVA, p less than 0.05) hexanal concentrations as compared to all other treatments (items (a), (c) and (d)) starting at day three of the experiment for both instant coffees evaluated.
Figure 10:
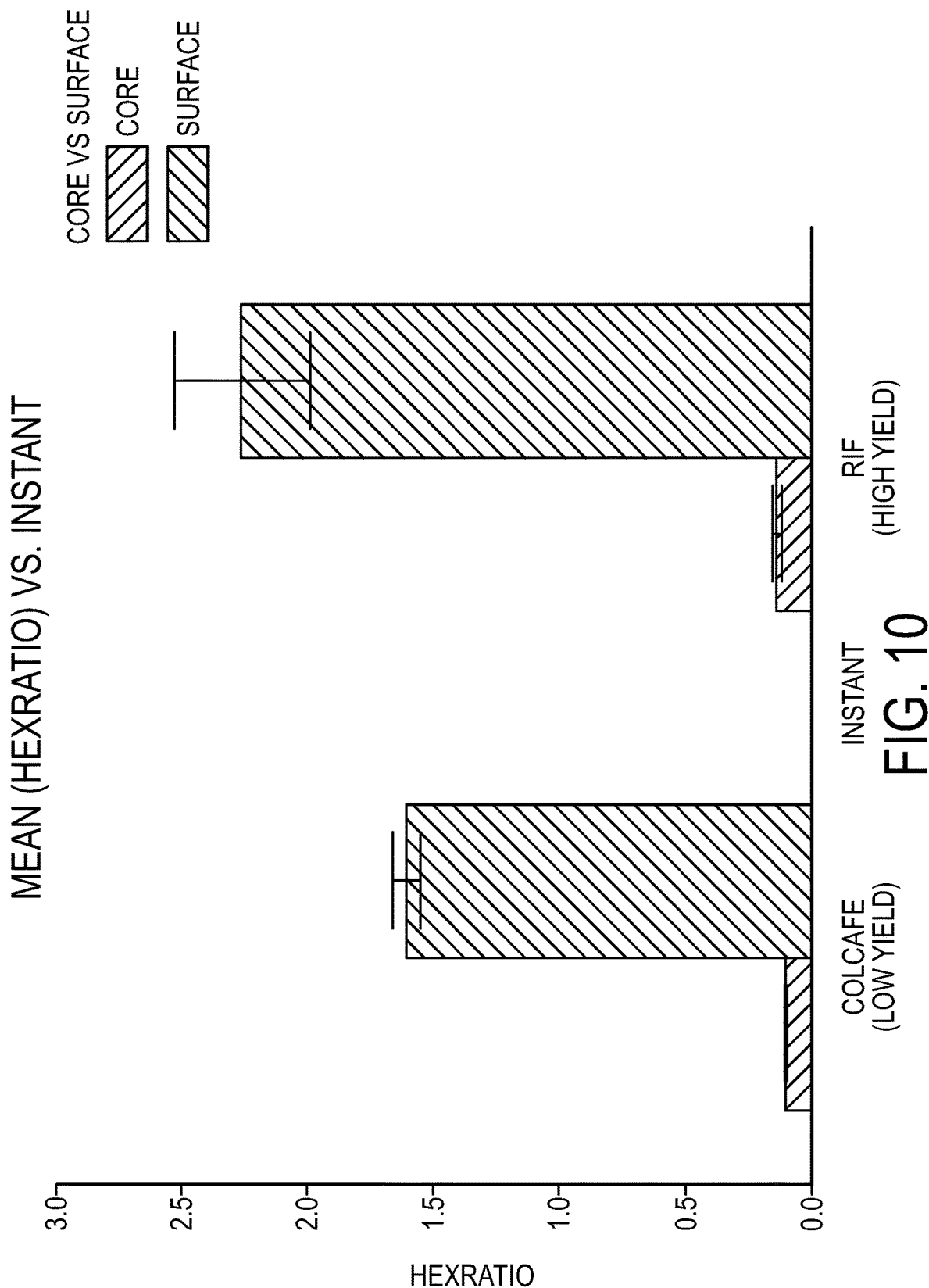
FIG. 10 is a graph illustrating that the surface of the three-dimensional coffee structures has a significantly higher (ANOVA, p less than 0.05) concentration of hexanal than the core of the coffee structures as evidenced by higher hexanal/deuterated hexanal ratio for the surface of the coffee structures (see item (b))
Figure 11A:
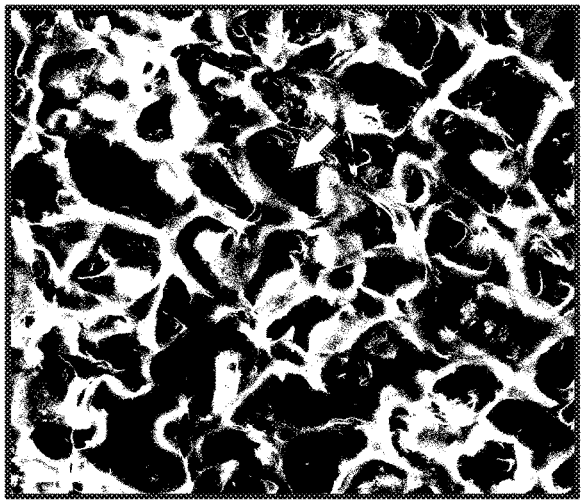
FIG. 11A is an electron micrograph depicting void spaces with sharp edges resulting from the remnants of cell walls of the coffee seed.
Figure 11B:
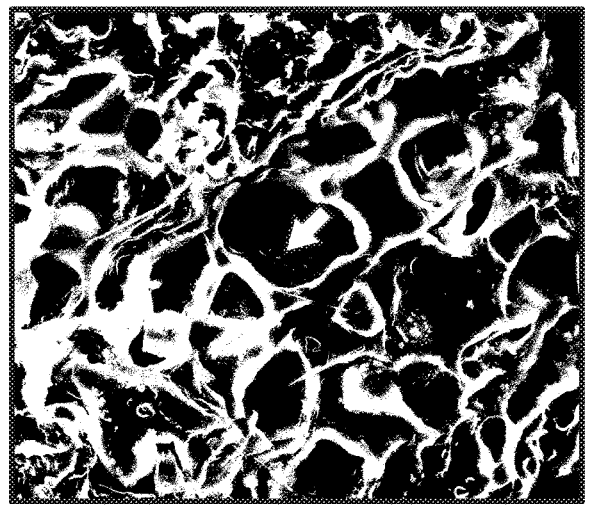
FIG. 11B is an electron micrograph depicting that some portions of the un-coated coffee particulate particles are similarly un-coated.
Figure 11C:
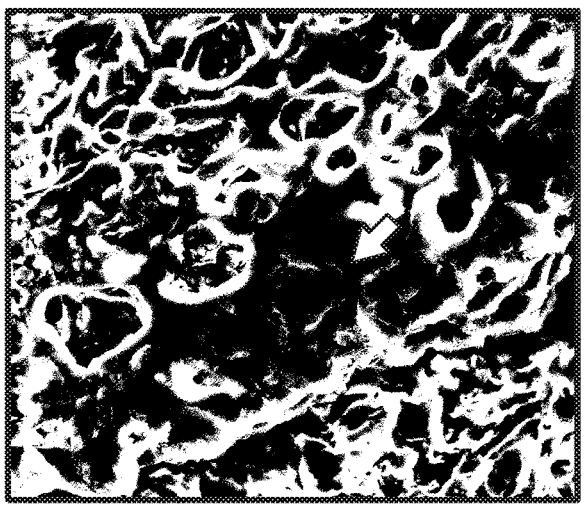
FIG. 11C is an electron micrograph depicting other portions of an instant coffee coating.

Specifically, FIG. 9A illustrates that the three-dimensional coffee structures of item (b) above are scored significantly lower compared to all other forms of coffee (items (a), (c) and (d)) for papery notes, a measure of coffee staling, for both instant coffee types. FIG. 9B illustrates that the three-dimensional coffee structures of item (b) above have significantly lower hexanal concentrations as compared to all other treatments (items (a), (c) and (d)) starting at day three of the experiment for both instant coffees evaluated. FIG. 10 illustrates that the surface of the three-dimensional coffee structures have a significantly higher concentration of hexanal than the core of the coffee structures as evidenced by higher hexanal/deuterated hexanal ratio for the surface of the coffee structures (see item (b) above). This difference is identified in the coffee structures of item (b) using both instant coffee types. FIGS. 11A, 11B and 11C are electron micrographs of un-treated roast and ground coffee particles where FIG. 11A depicts void spaces with sharp edges resulting from the remnants of cell walls of the coffee seed; FIG. 11B depicts that some portions of the un-coated coffee particulate particles are similarly un-coated; and FIG. 11C depicts that other portions exhibit an instant coffee coating.

Coffee Film as a Barrier to Lipid Oxidation in Roast and Ground Coffee: To test the barrier effects of an instant coffee coating apart from the effect of product form, this experiment places roast and ground coffee into metal tins that are then subjected to accelerated aging using UV light. The tins protect the coffee from light except at the exposed surface. The tins are then assigned to one of four treatments: (i) uncovered with full exposure to UV light; (ii) covered with a metal tin lid; (iii) partially covered with instant coffee coating; and (iv) fully covered with an instant coffee coating. The tins are exposed to UV light for five days and then subjected to sensory and chemical evaluation. Samples are subjected to sensory evaluation by expert cuppers and evaluated for stale flavors. Hexanal levels are measured by purge and trap GC/MS (PT-GC/MS). Before analysis, deuterated hexanal is added to each vial as an internal standard.

Figure 12:
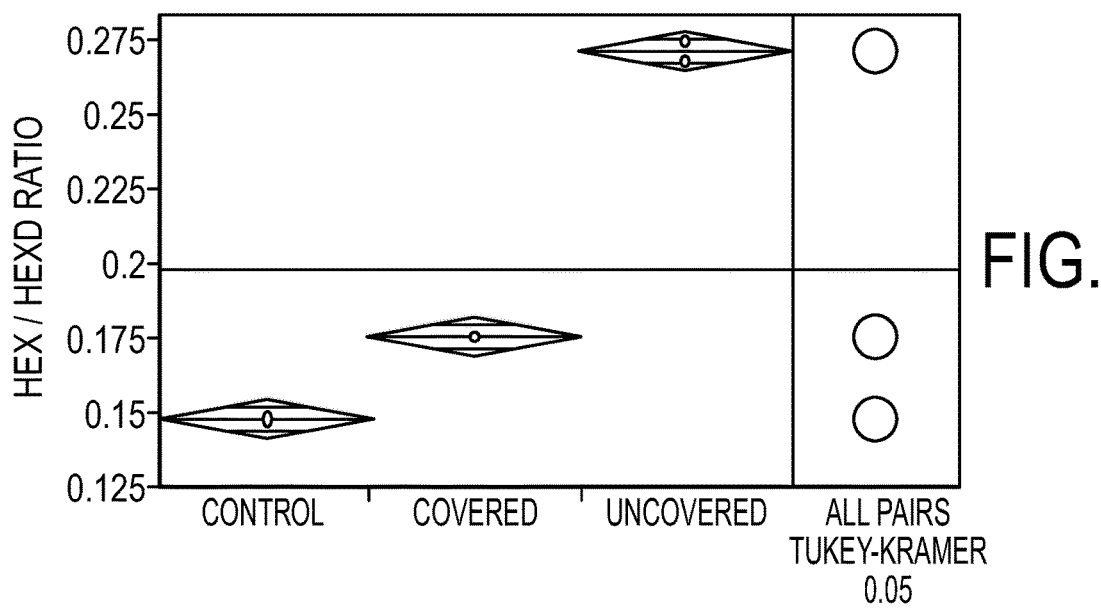
FIG. 12 is a graph illustrating various hexanal to deuterated hexanal ratios of samples covered with a tin lid (control) or covered with a full coating of instant coffee (covered)

Results: After five (5) days of aging, it is found that coffee covered with a full coating of instant coffee is not significantly different from coffee covered with a tin lid, thus showing no staling effect for both treatments. Coffee exposed to UV light, or with a partial coating, tastes stale. Matching the sensory results, the level of hexanal in the uncovered samples is significantly higher than in the control or fully coated samples, indicating that the fully coated samples are protected from staling. As shown in FIG. 12, the hexanal to deuterated hexanal ratio of samples covered with a tin lid (control) or covered with a full coating of instant coffee (covered) are significantly lower than uncovered samples, indicating that less staling had occurred.

Coffee Film as a Barrier to Lipid Oxidation in Roast and Ground Coffee: This experiment is designed to test if thin layers of instant coffee could prevent staling of roast and ground coffee. In this experiment, thin layers if instant coffee (covering two ranges of thickness, averaging 45 μm and 258 μm, respectively) are created on a scaffolding of nylon mesh. Layers are created by applying hydrated instant coffee (1:1 w/w with water) to the mesh with a brush. The scaffold is then allowed to air dry at room temperature overnight. The resulting layers of instant coffee are then fixed over trays of roast and ground coffee. Trays are then subjected accelerated aging using UV light. Staling is assessed through sensory evaluation and measurement of chemical staling markers. Samples are subjected to sensory evaluation using expert cuppers. Cuppers assigned each coffee a "papery" flavor score from 0 (no papery) to 10 (extremely high papery) as a measure for staleness. Hexanal levels are measured by purge and trap GC/MS (PT-GC/MS). Before analysis, deuterated hexanal is added to each vial as an internal standard. The instant coffee films are visualized and their thickness measured using ESEM (150× magnification). Thin films averaged 48 μm in thickness (minimum 23 μm), while the thicker films averaged 258 μm in thickness. A nylon mesh is used as a scaffolding to form thin layers of instant coffee. To test the effectiveness of these layers in preventing staling, the mesh scaffolds with and without instant coffee are placed over trays of roast and ground coffee during accelerated aging using UV light.

Figure 13A:
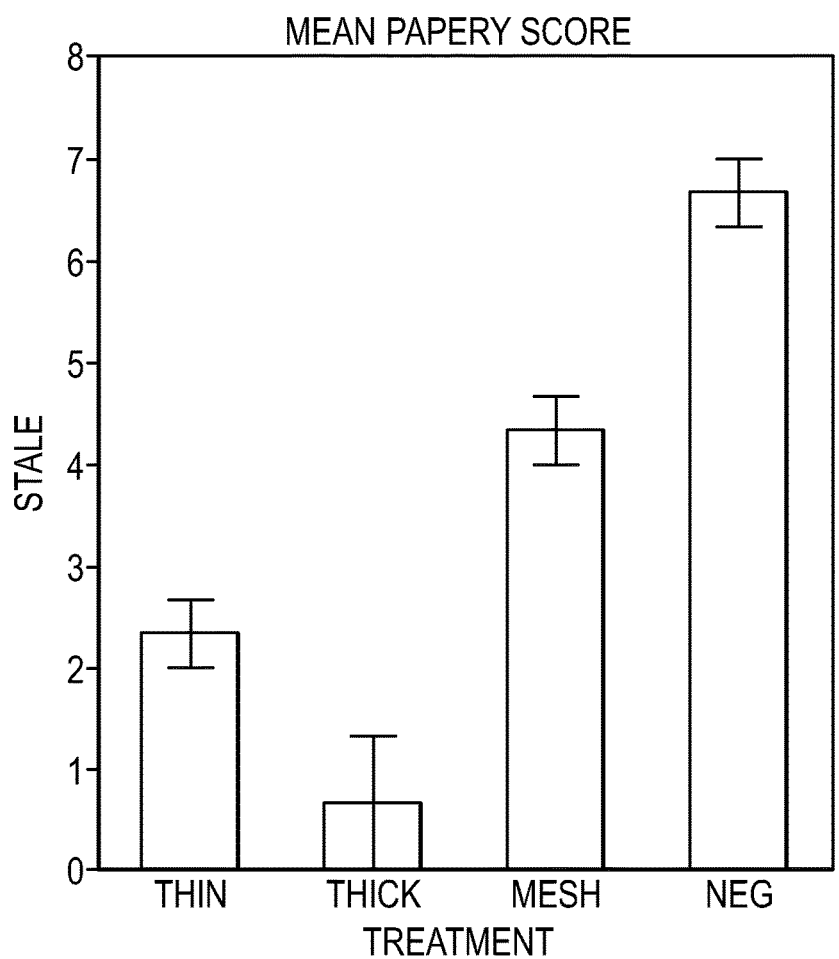
FIG. 13A is a graph illustrating that papery flavor scores for coffee covered with thin or thick layers of instant coffee are significantly lower than those of uncovered negative controls (neg) or mesh blank controls (mesh) indicating a protective effect of the instant coffee layers.
Figure 13B:
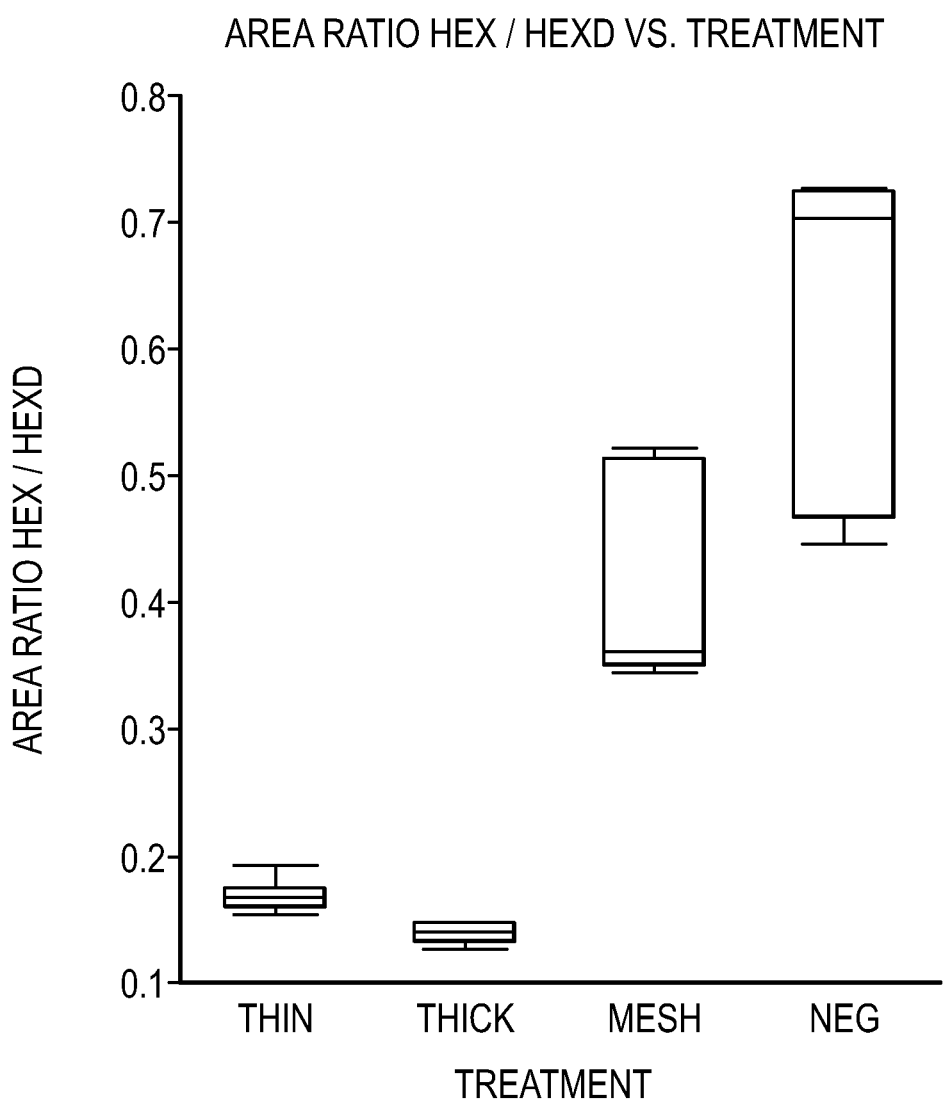
FIG. 13B is a graph illustrating that the area ratios between hexanal and deuterated hexanal for coffee covered with thin or thick layers of instant coffee are significantly lower than those of uncovered negative controls (neg) or mesh blank controls (mesh) indicating a protective effect of the instant coffee layers.
Figure 14A:
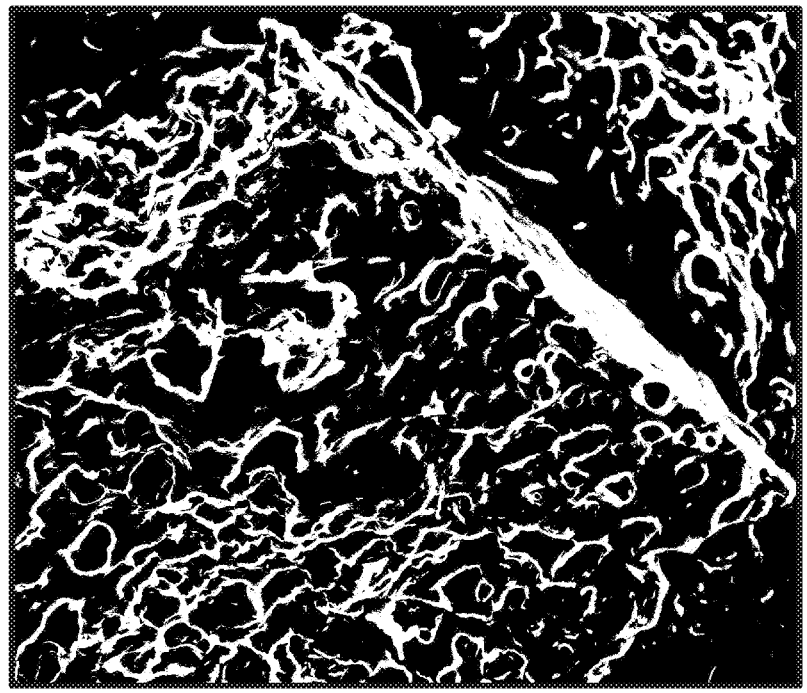
FIG. 14A is an electron micrograph showing the increased coating achieved for Treatment 2 of Table 7.
Figure 14B:
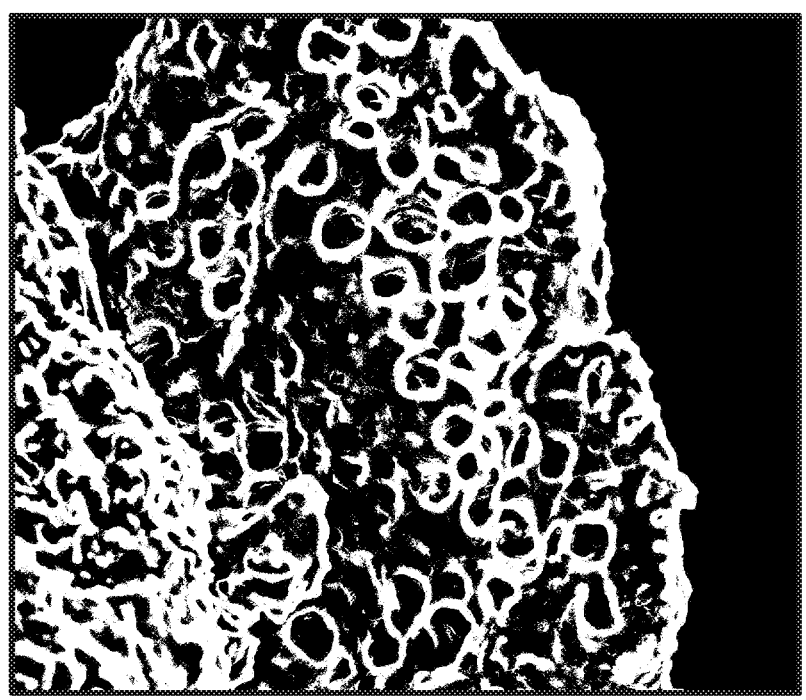
FIG. 14B is an electron micrograph showing the increased coating achieved for Treatment 4 of Table 7.
Figure 14C:
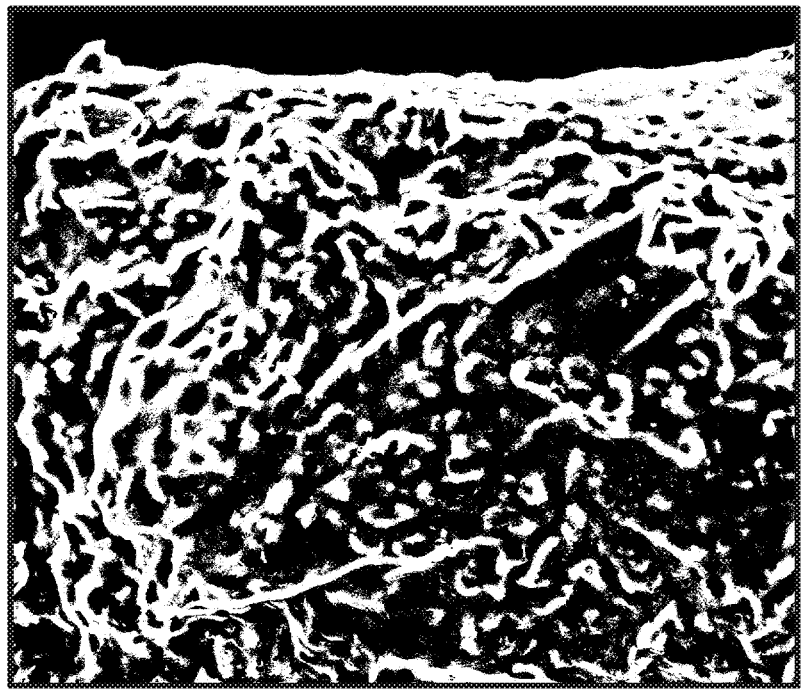
FIG. 14C is an electron micrograph showing the increased coating achieved for Treatment 6 of Table 7.
Figure 14D:
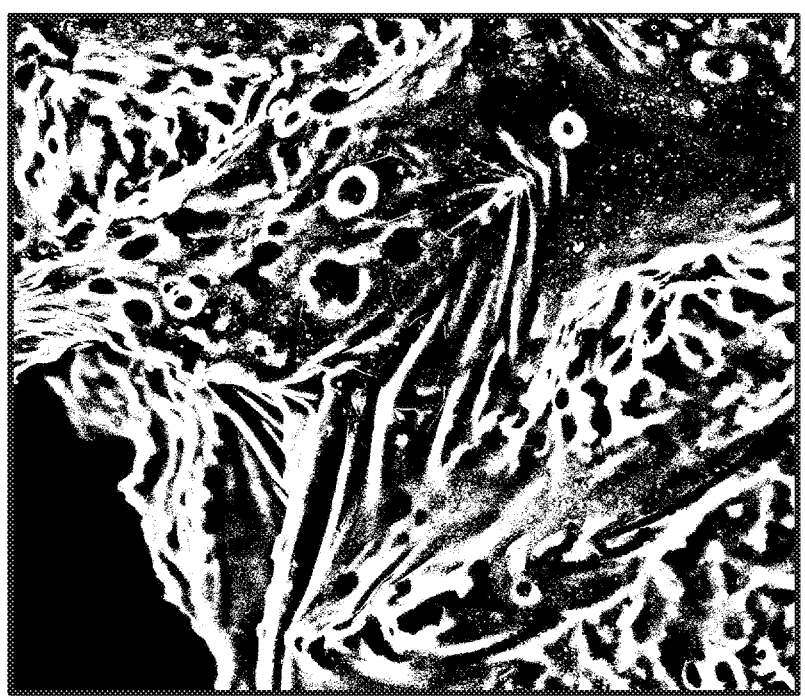
FIG. 14D is an electron micrograph showing the increased coating achieved for Treatment 8 of Table 7.
Figure 14E:
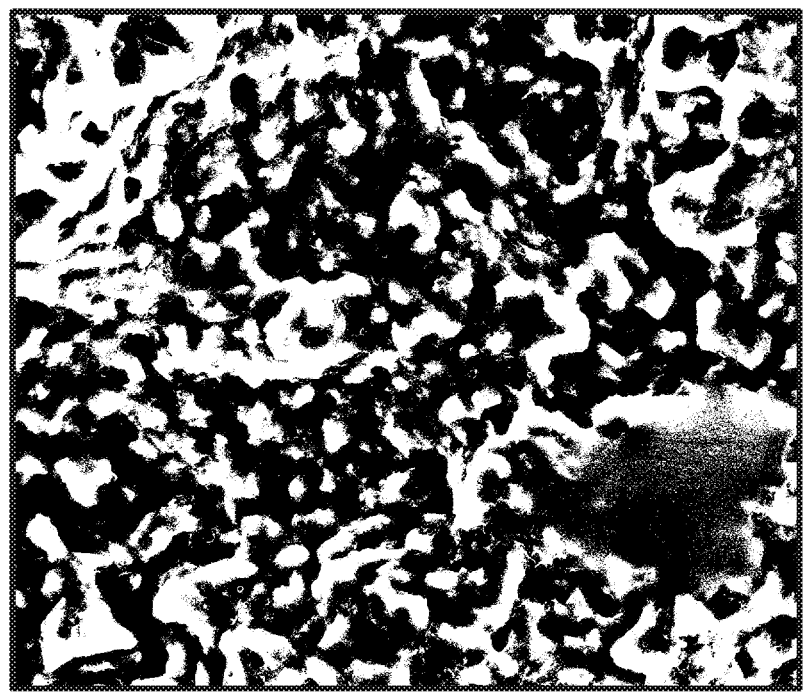
FIG. 14E is an electron micrograph showing the increased coating achieved for Treatment 10 of Table 7.

Results: It is found that the instant coffee films (both thicknesses) are able to reduce staling in the roast and ground coffee as assessed though sensory evaluation and measurement of the chemical staling marker hexanal (see FIGS. 13A and 13B, respectively). This experiment demonstrates that a thin film of instant coffee is able to confer a protective effect against staling for roast and ground coffee. As illustrated in FIG. 13A, papery flavor scores for coffee covered with thin or thick (average thickness 48 μm and 258 μm, respectively) layers of instant coffee are significantly lower than those of uncovered negative controls (neg) or mesh blank controls (mesh) indicating a protective effect of the instant coffee layers. As illustrated in FIG. 13B, the area ratios between hexanal and deuterated hexanal for coffee covered with thin or thick (average thickness 48 μm and 258 μm, respectively) layers of instant coffee are significantly lower than those of uncovered negative controls (neg) or mesh blank controls (mesh) indicating a protective effect of the instant coffee layers.

Creating Roast and Ground Particles with Instant Coating: This set of experiments evaluates several different methods of combining at least one roast and ground coffee with a hydrated slurry formed from water and at least one instant coffee (or equivalent) for their ability to form an instant coffee coating on the at least one type of roast and ground coffee (see Table 7 for the various particulars). Coating completeness is evaluated by electron microscopy. The method of forming the coated products of Treatments 2, 4, 6, 8 and 10 is discussed in detail below. Each form represents a different means of application that is effective in producing a coating with a coverage within the scope of the present invention as discussed above. As shown in Table 7, different treatments are tested to see if a coating of instant coffee within the scope of the present invention as detailed herein could be applied to roast and ground coffee particles.

paddle attachment (about 0.5 minutes) Step (2): Once the liquid coffee concentrate has begun to coat the mixing bowl, ADC Brewer Grind Size roast and ground coffee is slowly added to the mixing bowl while continuing to mix at low speed. The roast and ground coffee is combined with the liquid coffee concentrate at ratio of 80 parts roast and ground coffee to 20 parts liquid coffee concentrate (e.g., 80.0 grams roast and ground coffee to 20.0 grams liquid coffee concentrate). Step (3): The roast and ground coffee and the liquid coffee concentrate suspension are mixed using a stand mixer with spatula paddle attachment at low speed until combined (roughly two to three minutes). Step (4): Once roast and ground coffee and liquid coffee concentrate are fully combined, the resulting mixture is transferred to a #8 sieve screen where it is gently pressed through the screen. The resulting matrix is then transferred to a drying surface (e.g., a standard cookie sheet pan lined with aluminum foil). Step (5): The resulting matrix is allowed to dry over night or until excess moisture is removed.

Treatment 4—Particulate Air Dried: Step (1): Creating the instant coffee suspension is accomplished by combining one part (20.0 grams) of at least one type of instant coffee (e.g., Regular instant Folgers (RIF) pre-agglomeration) with one part processing water of equal mass (20.0 grams) in a clean stand mixer bowl. The instant coffee and water are combined at room temperature using a spatula paddle attachment at low speed until fully mixed (about two to three minutes). Step (2): Once the instant coffee suspension is homogeneous, ADC Brewer Grind Size roast and ground coffee is slowly added to the mixing bowl while continuing to mix at low speed. The roast and ground coffee is combined with the instant coffee slurry at ratio of 80 parts roast and ground coffee to 20 parts instant coffee to 20 parts processing water (e.g., 80.0 grams roast and ground coffee to 20.0 grams instant coffee and 20.0 grams processing water). Step (3): The roast and ground coffee and the instant coffee suspension are mixed using a stand mixer with spatula paddle attachment at low speed until combined (roughly two to

TABLE 7

| Treatment | Description | Specific Details |
|---|---|---|
| 1 | Roast and Ground Coffee with Liquid Coffee Concentrate | 80 parts R & G coffee to 20 parts liquid coffee concentrate, hand pressed into a cake and oven dried |
| 2 | Roast and Ground Coffee with Liquid Coffee Concentrate, small agglomerates | 80 parts R & G coffee to 20 parts liquid coffee concentrate, hand pressed through a #8 sieve to make pellets |
| 3 | Thin Wafer | 80 parts R & G coffee to 20 parts instant coffee, 1 gram pressed, dried in oven |
| 4 | Particulate Air Dried | 80 parts R & G coffee to 20 parts instant coffee, not formed, dried as a particulate in air |
| 5 | Particulate Oven Dried | 80 parts R & G coffee to 20 parts instant coffee, not formed, dried as a particulate in dryer |
| 6 | Particulate #16 Sieve | 80 parts R & G coffee to 20 parts instant coffee, not formed, pressed through a #16 sieve, dried as a particulate |
| 7 | Particulate | 1.5/1 weigh ratio of R & G to instant, not formed, dried as a particulate |
| 8 | Particulate | 3/1 weigh ratio of R & G to instant, not formed, dried as a particulate |
| 9 | Microgrind | Microgrind coffee (particle size is less than 250 μm), combined with instant coffee at a 1:1 weigh ratio |
| 10 | Microgrind | Microgrind coffee (particle size is less than 250 μm), combined with instant coffee at a 4:1 weigh ratio (80/20 weight percent) |

The following discussion below will detail various production methods for some of the Treatments disclosed above in Table 7.

Treatment 2—Roast and Ground Coffee with Liquid Coffee Concentrate, small agglomerates: Step (1): Place liquid coffee concentrate (20.0 g liquid coffee concentrate for 100 grams of mix) in a clean stand mixer bowl. Agitate the coffee concentrate at room temperature using a spatula three minutes). Step (4): Once the roast and ground coffee and the instant coffee suspension are fully combined, the resulting mixture is spread over a drying tray (e.g., a standard cookie sheet pan lined with aluminum foil) and allowed dry over night or until all the excess processing water is removed.

Treatment 6—Particulate #16 Sieve: Step (1): Creating the instant coffee suspension is accomplished by combining one part (20.0 grams) instant coffee (e.g., Regular instant Folgers (RIF) pre-agglomeration) with one part processing water of equal mass (20.0 grams) in a clean stand mixer bowl. The instant coffee and water are combined at room temperature using a spatula paddle attachment at low speed until combined (about two to three minutes). Step (2): Once the instant coffee suspension is homogeneous, ADC Brewer Grind Size roast and ground coffee is slowly added to the mixing bowl while continuing to mix at low speed. The roast and ground coffee is combined with the instant coffee slurry at ratio of 80 parts roast and ground coffee to 20 parts instant coffee to 20 parts processing water (e.g., 80.0 grams roast and ground coffee to 20.0 grams instant coffee and 20.0 grams processing water). Step (3): The roast and ground coffee and the instant coffee suspension are mixed using a stand mixer with spatula paddle attachment at low speed until combined (roughly two to three minutes). Step (4): Once roast and ground coffee and the instant coffee suspension are fully combined, the resulting mixture is transferred to a #16 sieve screen where it is gently pressed through the screen in order to create small agglomerates/particles over a catch tray that can be used for drying (e.g., a standard cookie sheet pan lined with aluminum foil). The screening process creates small agglomerates that dry easily at room temperature. Step (5): The resulting mixture is allowed to dry over night or until all the excess processing water is removed.

Treatment 8—Particulate: Step (1): Creating the instant coffee suspension is accomplished by combining one part (20.0 grams) instant coffee (e.g., Regular instant Folgers (RIF) pre-agglomeration) with one part processing water of equal mass (20.0 grams) in a clean stand mixer bowl. The instant coffee and water are combined at room temperature using a spatula paddle attachment at low speed until combined (about two to three minutes). Step (2): Once the instant coffee suspension is homogeneous, ADC Brewer Grind Size roast and ground coffee is slowly added to the mixing bowl while continuing to mix at low speed. The roast and ground coffee is combined with the instant coffee slurry at ratio of 60 parts roast and ground coffee to 20 parts instant coffee to 20 parts processing water (e.g., 60.0 grams roast and ground coffee to 20.0 grams instant coffee and 20.0 grams processing water). Step (3): The roast and ground coffee and the instant coffee suspension are mixed using a stand mixer with spatula paddle attachment at low speed until combined (roughly two to three minutes). Step (4): Once roast and ground coffee and the instant coffee suspension are fully combined, the resulting mixture is spread over a drying tray (e.g., a standard cookie sheet pan lined with aluminum foil) and allow dry over night or until all the excess processing water is removed.

Treatment 10—Microgrind: Step (1): Creating the instant coffee suspension is accomplished by combining one part (50.0 grams) instant coffee (e.g., Regular instant Folgers (RIF) pre-agglomeration) with one part processing water of equal mass (50.0 grams) in a clean stand mixer bowl. The instant coffee and water are combined at room temperature using a spatula with gentle agitation. Allow the resulting coffee-water mixture to settle for about 30 minutes. Remove any foam from the top of the instant coffee suspension and retain the de-foamed suspension. Step (2): Combine the de-foamed instant coffee suspension with microgrind roast and ground coffee in a stand mixer bowl at a ratio of 80 parts roast and ground coffee to 20 parts dry instant coffee equivalent (80.0 grams roast and ground coffee to 40.0 grams of instant coffee suspension from Step (1)). Mix microgrind roast and ground coffee and instant coffee suspension using a stand mixer with spatula paddle attachment at low speed until combined (roughly two to three minutes). Step (3): Once the roast and ground coffee and the instant coffee suspension are fully combined, the resulting mixture is spread over a drying tray (e.g., a standard cookie sheet pan lined with aluminum foil) and allow dry over night or until all the excess processing water is removed.

Figure 15:
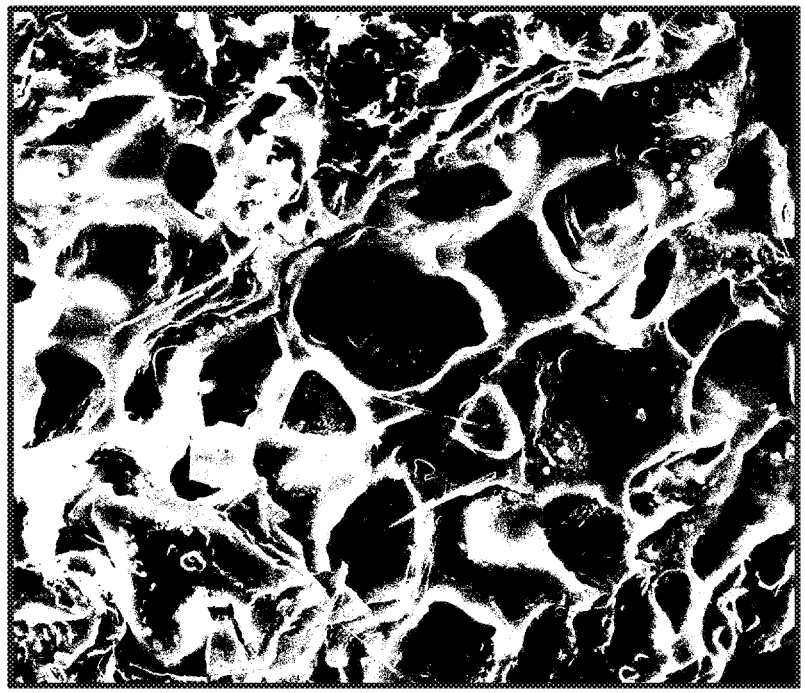
FIG. 15 is an electron micrograph of un-formed coffee particulate particles where the electron micrograph shows void spaces with sharp edges resulting from the uncoated regions on a treated coffee ground.
Figure 16:
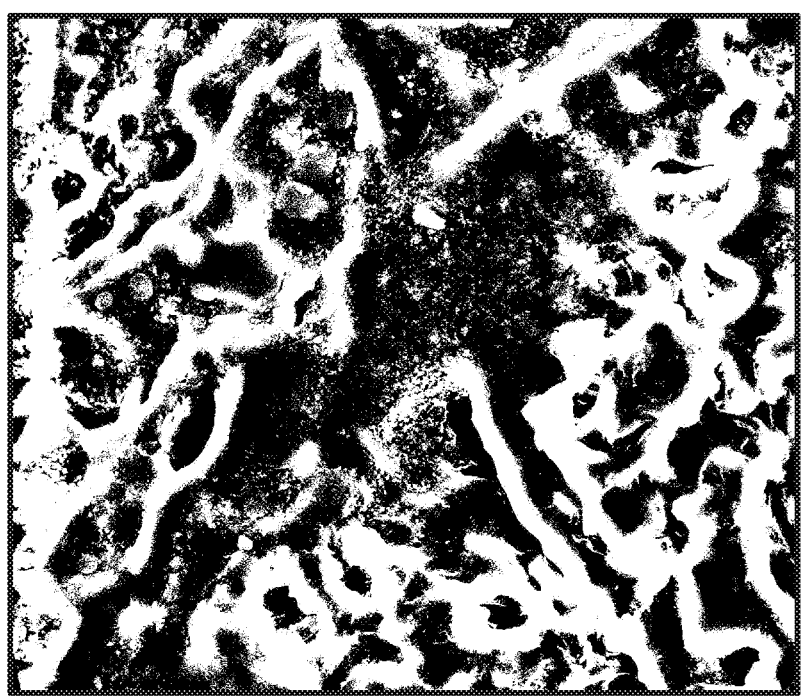
FIG. 16 is an electron micrograph of a preferred embodiment of the present invention showing coating achieved of coffee extract on roast and ground coffee particles.

Results: The above experiments found that by varying one of several variables, a desired shell formed from one or more types of liquid coffee concentrate or instant coffee, with any desired coverage percentage as disclosed above, could be achieved around individual roast and ground coffee particles (see FIGS. 14A through 14E) as evidenced by comparison to uncoated regions of a un-formed coffee particulate coffee ground (see FIG. 15). Variables within the scope of the present invention include, but are not limited to, increasing the amount of water in the water/instant coffee mixture, varying the roast and ground particle size, increasing the amount of instant coffee slurry to roast and ground coffee to form the instant coffee/roast and ground mixture, and/or altering the post-mix handling process.

More Anti-Staling Working Examples: Multiple experiments to test anti-staling properties of coffee extract coatings are setup and run to analyze the impact of the following: (i) surface area to volume ratio; (ii) instant coffee mass to water ratio; and (iii) use of liquid coffee extract as a coating substance. Accelerated aging using UV light box is utilized for three to four days of aging. Staling of the coffee samples is assessed by expert panelists through independent assessments. The trained expert panelists score the staling of the coffee based on a scale from 1 (not stale) to 5 (very stale), where scores 3 or above are recognized as staling of the coffee samples. For example, the following descriptors apply to the scores: 1 (Not Stale); 2 (Very Slight Off Note); 3 (Slight Stale); 4 (Stale); and 5 (Very Stale).

Impact of Surface Area to Volume Ratio on Staling of Coffee: Two sample types of coffee are prepared to assess the impact of surface area to volume ratio on coffee samples which include (1) loose roast and ground coffee on a tray; and (2) three-dimensional coffee structures prepared from the any one of the coffee compositions prepared by methods discussed herein. For item (1) the loose roast and ground coffee the percent of surface area exposed to UV light is controlled with aluminum foil (Al) or sheets of instant coffee film (IF) laid over the roast and ground coffee. The coffee on an uncovered tray has one (top) surface exposed to UV (50 percent of surface area) and one (bottom) surface against the tray bottom (50 percent of surface area). For item (2) the three-dimensional coffee structure (cylindrical shaped) only the top surface of the structure is directly exposed to UV light. Decreasing the mass of the structure changes its height, but does not change its diameter. Further, decreasing the mass of the structure increases the surface area exposed to UV light for a given mass of structures (approximately 34 grams). Both coffee samples are exposed to UV light for four days. The samples are then used to brew coffee and assessed for staling by expert panelists where a score of three (3) or greater is considered to indicate staling of the coffee products and brew therefrom (as noted above).

Results: Item (1) the loose roast and ground coffee on a tray started to stale between 75 percent and 85 percent coverage. The instant coffee film (IF) covered coffee samples performed as well as the aluminum foil (Al) covered coffee samples. The three dimensional structures of the present invention discussed herein started to stale between tablets weights of about four gram to two gram target weights. As seen in Table 8, staling of coffee samples discussed above is not detected at a surface to area volume ratio at or below 0.82. Staling is detected at a surface area to volume ratio at or above 1.39. Exposed surface area to volume ratios for preventing staling of any of the coffee compositions prepared by methods discussed herein are at least about 0, at least about 0.02, at least about 0.05, at least about 0.07, at least about 0.10, at least about 0.12, at least about 0.15, at least about 0.17, at least about 0.20, at least about 0.22, at least about 0.25, at least about 0.27, at least about 0.30, at least about 0.32, at least about 0.35, at least about 0.37, at least about 0.40, at least about 0.43 at least about 0.45, at least about 0.48, at least about 0.50, at least about 0.53, at least about 0.55, at least about 0.57, at least about 0.60, at least about 0.62, at least about 0.65, at least about 0.67, at least about 0.70, at least about 0.02, at least about 0.75, at least about 0.77, at least about 0.80, at least about 0.82, at least about 0.84, at least about 0.86, at least about 0.88, at least about 0.90, at least about 0.92, at least about 0.94, at least about 0.96, at least about 0.98, or even at least about 1. Here, as well as elsewhere in the specification and claims, individual numerical values, or limits, can be combined to form additional non-disclosed and/or non-stated ranges.

TABLE 8

| Treatment | Exposed Surface Area to Volume Ratio | Stale Score (1-5) |
| --- | --- | --- |
| Tray Al 100% covered R & G coffee | 0.00 | 1 |
| Tray Al 97.5% covered R & G coffee | 0.32 | 1 |
| 8.5 g Formed Coffee Product (current invention) | 0.42-0.43 | 1 |
| 6.5 g Formed Coffee Product (current invention) | 0.48-0.50 | 1 |
| Tray Al 95% covered R & G coffee | 0.53 | 2 |
| Tray IF 95% covered R & G coffee | 0.53 | 2 |
| 4.0 g Formed Coffee Product (current invention) | 0.77-0.82 | 2 |
| 2.0 g Formed Coffee Product (current invention) | 1.39-1.45 | 3 |
| Tray Al 85% covered R & G coffee | 1.58 | 3 |
| Tray Al 75% covered R & G coffee | 2.63 | 4 |
| Tray uncovered (50% total exposure) R & G coffee | 5.26 | 5 |

Impact of Instant Coffee Dilution on Staling: Instant coffee is diluted in water at three ratios are analyzed including: (i) 1:1 instant coffee to water; (ii) 1:2 instant coffee to water; and (iii) 1:4 instant coffee to water ratios to understand the target weight percent of instant coffee. The instant coffee dilutions of items (i) through (iii) above are tested on micro grind roast and ground coffee (particle size of about 200 microns or less) and ADC brewer grind size roast and ground coffee (average particle size of about 1000 microns). All treatments of items (i) through (iii) are applied using various methods as discussed herein of the present invention at an 80:20 mix of roast and ground coffee to instant coffee to make coffee compositions of the present invention as discussed herein. The coffee samples are exposed to UV light for four days. The samples are then used to brew coffee and assessed for staling by expert panelists where a score of three (3) or greater is considered to indicate staling of the coffee products and brew therefrom (as noted above).

Results: For the microgrind coffee samples with a more diluted suspension of instant coffee (1:4) to water is more effective at protecting the microgrind coffee from staling than more concentrated suspensions (1:1 or 1:2), which is likely due to increased coating with less dense extract suspension on this grind size. The negative control received a stale score of five (5) (very stale), the 1:1 and 1:2 ratio of instant coffee to water received stale scores of three (3) (slightly stale), and the 1:4 ratio of instant coffee to water received a stale score of one (1) (not stale) For ADC brewer grind size, the larger grind size, a more concentrated suspension of instant coffee in water is more effective at protecting the coffee from staling. The larger grind size may absorb the suspension differently than smaller particles. Grind size is critical to determine the target instant coffee dilution (weight percent) for forming the coating. It is determined that different dilutions needed at different grind sizes. For the microgrind a 1:4 dilution is targeted and for the ADC brewer grind size, a 1:1-1:2 dilution is targeted. For the ADC brewer grind size, the negative control received a stale score of five (5) (very stale), the 1:1 and 1:2 ratio of instant coffee to water received stale scores of one (1) (not stale), and the 1:4 ratio of instant coffee to water received a stale score of three (3) (slightly stale).

Impact of Roast and Ground Coffee to Coffee Extract Ratio on Staling: Three ratios of roast and ground coffee to instant coffee extract are analyzed including: (i) 80:20 roast and ground coffee to instant coffee extract; (ii) 70:30 roast and ground coffee to instant coffee extract; and (iii) 60:40 roast and ground coffee to instant coffee extract (all at a weight to weight). Two roast and ground grind sizes of coffee are analyzed for the coating of instant coffee thereof including microgrind and ADC brewer grind size. Liquid coffee concentrate is used to coat the roast and ground coffee. All roast and ground coffee samples are in particulate form. The coated coffee samples are aged under UV light for three days. The samples are then used to brew coffee and assessed for staling by expert panelists where a score of three (3) or greater is considered to indicate staling of the coffee products and brew therefrom (as noted above).

Results: For the liquid coffee concentrate coating on microgrind coffee, an increased amount of liquid coffee (60:40 ratio) in the formulation helps prevent staling versus less mass of liquid coffee (80:20 or 70:30 ratios). The same trend is seen for instant coffee suspensions where a greater volume of a more dilute suspension is more effective. The negative control received a stale score of five (5) (very stale), the 60:40 ratio received stale scores of one (1) (not stale), the 70:30 ratio received a stale score of three point five (3.5) (slightly stale to stale) and the 80:20 ratio received a stale score of three (3) (slightly stale). For liquid coffee concentrate coating on ADC brewer grind size, an increased amount of liquid coffee (70:30 ratio) staled while application of liquid coffee 20 percent by weight did not. The 60:40 application is too liquid to form particulates and is untestable. The same trend is seen for instant coffee suspensions where a greater volume of a more dilute suspension is less effective. The negative control received a stale score of five (5) (very stale), the 70:30 ratio received a stale score of the five (5) (very stale) and the 80:20 ratio received a stale score of one (1) (not stale).

Summary of Anti-Staling Working Examples: The total solids concentration and liquid volume impact the instant coating effectiveness of protecting the roast and ground coffee from staling. Target application of the instant coating on microgrind coffee is an instant coffee dilution of 1:4 instant coffee to water and an instant slurry applied at 80:20 roast and ground coffee to instant coffee (weight to weight). Target weight of liquid coffee concentrate application for microgrind coffee is a target applied at 60:40 roast and ground to liquid coffee concentrate (weight to weight). Target application for ADC brewer grind size coffee for instant coffee dilution is about a 1:1 to about a 1:2 instant coffee to water ratio and an instant slurry applied at 80:20 roast and ground coffee to instant coffee (weight to weight). Target weight of liquid coffee concentrate application for ADC brewer grind size coffee is target applied at 80:20 roast and ground to liquid coffee concentrate (weight to weight).

The present disclosure has been described with reference to exemplary embodiments, it will be understood that it is not intended that the present invention be limited solely to such embodiments. Obviously, modifications and alterations will occur to others upon reading and understanding the preceding detailed description. In some embodiments of the invention, certain features of the invention can sometimes be used to advantage without a corresponding use of the other features. It is intended that the present disclosure be construed as including all such modifications and alterations insofar as they come within the scope of the appended claims or the equivalents thereof.

What is claimed is:

1. A coffee composition comprising:
a plurality of dried, coated ground roast coffee particles compacted to a compaction of 60% to 70%;
wherein the coating binds the plurality of coated ground roast coffee particles into a three-dimensional coffee structure and is formed from a mixture of a first coffee extract that includes coffee solids from instant coffee and a second coffee extract that includes coffee solids, wherein the second coffee extract is extracted from the plurality of ground roast coffee particles, the coating has an average thickness in the range of 5 microns to 1,500 microns and the average coating coverage of an outer surface of the plurality of ground roast coffee particles is in the range of 50% to 100%;
wherein a weight percent of the plurality of ground roast coffee particles is in the range of 60 wt % to 82.5 wt % based on of the total weight of the plurality of ground roast coffee particles and the coffee solids of the first coffee extract,
a weight percent of the first coffee extract is in the range of 17.5 wt % to 40 wt % based on of the total weight of the plurality of ground roast coffee particles and the coffee solids of the first coffee extract.

2. The coffee composition of claim 1, wherein the coating is prepared by mixing instant coffee with water in a weight to weight ratio of instant coffee to solvent of 1:4 to 2:1 to form a solution of the first coffee extract;
mixing ground roast coffee particles and the solution of the first coffee extracts until a granulated composition is formed, thereby extracting the second coffee extract from the ground roast coffee particles forming a mixture of the first coffee extract and the second extract from the ground roast coffee particles; and
drying the granulated composition to form the coating on the outer surface of the ground roast coffee particles.

3. The coffee composition of claim 1, wherein the coating is prepared by
mixing ground roast coffee particles and a liquid coffee concentrate comprising the first coffee extract until a granulated composition is formed, thereby extracting the second coffee extract from the ground roast coffee particles forming a mixture of the first coffee extract and the second extract from the ground roast coffee particles; and
drying the granulated composition to form the coating on the outer surface of the ground roast coffee particles.

4. The coffee composition of claim 1, wherein the coffee composition is free of non-coffee binders.

5. The coffee composition of claim 1, wherein the coffee composition aged for 4 days in a UV light box with an exposed surface to area volume ratio of less than 0.82 produces a brewed coffee that receives a score of less than or equal to 3 when scored by trained expert panelists coffee; wherein the trained expert panelists coffee scale the coffee based on the following scoring descriptors 1 Not Stale; 2 Very Slight Off Note; 3 Slight Stale; 4 Stale; and 5 Very Stale.

6. The coffee composition of claim 1, wherein the coffee composition after exposure to UV light for a period of 7 days produces a brewed coffee with a hexanal content of less than 40 ng/g.

7. The coffee composition of claim 1, wherein the coffee composition after exposure to UV light for a period of 7 days produces a brewed coffee with a hexanal content of less than 20 ng/g.

8. The coffee composition of claim 1, wherein an 8.5 gram to a 12.5 gram coffee product formed from the composition of claim 1 yields brew solids in the range of 0.90 weight percent to 3.00 weight percent.

9. The coffee composition of claim 1, wherein the coffee composition exhibits a water activity of 0.35 to 0.42.

10. The coffee composition of claim 1, wherein the coated ground roast coffee particles are agglomerated.

11. The coffee composition of claim 1, wherein the three-dimensional coffee structure in the form of a cylinder, cube, cuboid, sphere, pellet, ellipsoid, triangular pyramid, hexagonal prism, truncated triangular pyramid, truncated square pyramid, hexagonal pyramid, truncated hexagonal pyramid, cone, truncated cone, diamond, a three dimensional shape with an oval-shaped face, a three dimensional shape with heart-shaped face, a three dimensional shape with triangle-shaped face, or pillow.

12. The coffee composition of claim 1, wherein the three-dimensional coffee structure readily disintegrates when contacted with brewing water for a brewing cycle.

13. The coffee composition of claim 1, wherein the three-dimensional coffee structure disassociates in hot water in 15 to 21 seconds, in room temperature water in 1 minute 7 seconds to 1 minute 24 seconds, and in cold water in 2 minutes 51 seconds to 4 minutes 12 seconds.

14. A coffee composition comprising:
a plurality of dried, coated ground roast coffee particles compacted to a compaction of 60% to 70%;
wherein the coating binds the plurality of coated ground roast coffee particles into a three-dimensional coffee structure and is formed from a mixture of a first coffee extract that includes coffee solids from instant coffee and a second coffee extract that includes coffee solids, wherein the second coffee extract is extracted from the plurality of ground roast coffee particles, the average coating coverage of an outer surface of the plurality of ground roast coffee particles is in the range of 50% to 100%;

wherein a weight percent of the plurality of ground roast coffee particles is in the range of 60 wt % to 90 wt % based on of the total weight of the plurality of ground roast coffee particles and the coffee solids of the first coffee extract, and a weight percent of the first coffee extract is in the range of 10 wt % to 40 wt % based on of the total weight of the plurality of ground roast coffee particles and the coffee solids of the first coffee extract; and wherein a coffee brewed from the coffee composition after exposure to UV light for a period of seven days has a reduced hexanal content as compared to coffee brewed from an otherwise identical coffee composition not including the coating.

* * * * *